(12) United States Patent
Kulkarni et al.

(10) Patent No.: US 8,669,314 B2
(45) Date of Patent: Mar. 11, 2014

(54) HYDROLYTIC STABILITY IN POLYCARBONATE COMPOSITIONS

(75) Inventors: Amit S. Kulkarni, Evansville, IN (US); James L. DeRudder, Mount Vernon, IN (US); Robert R. Gallucci, Mount Vernon, IN (US)

(73) Assignee: SABIC Innovative Plastics IP B.V., Bergen Op Zoom (NL)

( * ) Notice: Subject to any disclaimer, the term of this patent is extended or adjusted under 35 U.S.C. 154(b) by 0 days.

(21) Appl. No.: 13/365,802

(22) Filed: Feb. 3, 2012

(65) Prior Publication Data

US 2013/0203911 A1  Aug. 8, 2013

(51) Int. Cl.
*C08K 3/26*  (2006.01)

(52) U.S. Cl.
USPC .......................................... 524/424; 524/417

(58) Field of Classification Search
USPC ................................................ 524/417, 424
See application file for complete search history.

(56) References Cited

U.S. PATENT DOCUMENTS

| | | |
|---|---|---|
| 3,169,121 A | 2/1965 | Goldberg |
| 3,544,514 A | 12/1970 | Schnell |
| 3,635,895 A | 1/1972 | Kramer |
| 3,864,428 A | 2/1975 | Nakamura et al. |
| 4,001,184 A | 1/1977 | Scott |
| 4,264,487 A | 4/1981 | Fromuth et al. |
| 4,304,709 A | 12/1981 | Salee |
| 4,430,484 A | 2/1984 | Quinn |
| 4,487,896 A | 12/1984 | Mark et al. |
| 4,532,290 A | 7/1985 | Jaquiss et al. |
| 4,612,252 A | 9/1986 | Sagane et al. |
| 4,725,506 A | 2/1988 | Nagano |
| 5,013,777 A | 5/1991 | MacLeay et al. |
| 5,162,405 A | 11/1992 | MacLeay et al. |
| 5,208,362 A | 5/1993 | Glass et al. |
| 5,232,830 A | 8/1993 | Van Ness |
| 5,256,718 A | 10/1993 | Yamamoto et al. |
| 5,274,072 A | 12/1993 | Weaver et al. |
| 5,354,791 A | 10/1994 | Gallucci |
| 5,367,011 A | 11/1994 | Walsh |
| 5,411,999 A | 5/1995 | Gallucci |
| 5,441,997 A | 8/1995 | Walsh et al. |
| 5,451,624 A | 9/1995 | Memon et al. |
| 5,455,292 A | 10/1995 | Kakegawa et al. |
| 5,560,994 A | 10/1996 | Kitaike et al. |
| 5,589,530 A | 12/1996 | Walsh |
| 5,616,641 A | 4/1997 | Basch et al. |
| 5,670,564 A | 9/1997 | Gagne et al. |
| 5,922,816 A | 7/1999 | Hamilton |
| 6,127,466 A | 10/2000 | Murakami et al. |
| 6,262,133 B1 | 7/2001 | Wisner |
| 6,281,299 B1 | 8/2001 | Saito et al. |
| 6,414,072 B2 | 7/2002 | Murakami et al. |
| 6,497,964 B1 | 12/2002 | Matsumura et al. |
| 6,627,303 B1 | 9/2003 | Gallucci et al. |
| 6,677,047 B2 | 1/2004 | Matsumura et al. |
| 6,680,111 B1 | 1/2004 | Leibler et al. |
| 6,831,147 B1 | 12/2004 | Scholl et al. |
| 6,855,768 B2 | 2/2005 | Matsumura et al. |
| 7,122,251 B2 | 10/2006 | Tezuka et al. |
| 7,135,577 B2 | 11/2006 | Rai et al. |
| 7,277,230 B2 | 10/2007 | Srinivasan et al. |
| 7,326,763 B2 | 2/2008 | Kamps et al. |
| 7,365,124 B2 | 4/2008 | Srinivasan et al. |
| 7,375,177 B2 | 5/2008 | Arumugam et al. |
| 7,408,016 B2 | 8/2008 | Chatterjee et al. |
| 7,417,138 B2 | 8/2008 | Kim et al. |
| 7,425,603 B2 | 9/2008 | Raj et al. |
| 7,470,796 B2 | 12/2008 | Rai et al. |
| 7,563,817 B2 | 7/2009 | Ganesan et al. |
| 7,659,359 B1 | 2/2010 | Assink et al. |
| 7,666,972 B2 | 2/2010 | Jansen et al. |
| 7,671,164 B2 | 3/2010 | Brack et al. |
| 7,718,755 B2 | 5/2010 | Chatterjee et al. |
| 7,727,713 B2 | 6/2010 | Pedersen et al. |
| 7,786,246 B2 | 8/2010 | Jansen et al. |
| 7,790,832 B2 | 9/2010 | Ganesan et al. |
| 7,930,782 B2 | 4/2011 | Chen |
| 2001/0034415 A1 | 10/2001 | Queisser et al. |
| 2001/0036986 A1 | 11/2001 | Matsumura et al. |
| 2002/0006995 A1 | 1/2002 | Murakami et al. |
| 2002/0013412 A1 | 1/2002 | Saito et al. |
| 2003/0083419 A1* | 5/2003 | Seidel et al. .................. 524/451 |
| 2003/0100086 A1 | 5/2003 | Yao et al. |

(Continued)

FOREIGN PATENT DOCUMENTS

| | | |
|---|---|---|
| EP | 96893 A2 | 12/1983 |
| EP | 208789 A1 | 1/1987 |

(Continued)

OTHER PUBLICATIONS

Sud-Chemie, "SORBACID—The Eco-Friendly PVC Costabilizer," product brochure, undated reference, pp. 1-7.
Jesus Sanchez Martin et al., "Glyphosate-Hydrotalcite Interaction As Influenced By pH," *Clays and Clay Minerals*, vol. 47, No. 6, pp. 777-783, 1999.
Misra, C. at al., "Composition and Properties of Synthetic Hydrotalcites," *Clays and Clay Minerals*, vol. 40, No. 2, pp. 145-150, 1992.
Occelli, M. L. et al., "Basicity and Porosity of a Calcined Hydrotalcite-Type Material from Nitrogen Porosimetry and Adsorption Microcalorimetry Methods," *Chem. Mater.*, 2003, 15, pp. 4231-4238.
Akrochem Corp., "Hydrotalcite FG," product description, Nov. 2008, pp. 1.
Lyondell Chemical Co., "Additives: Antioxidants," tech.topic Equistar Technical Tip, undated reference, pp. 1.
Mayzo, Inc., "Benefos 1680," Product Data Sheet, Sep. 29, 2010, pp. 1-5.

(Continued)

*Primary Examiner* — Peter Szekely
(74) *Attorney, Agent, or Firm* — Ballard Spahr LLP

(57) ABSTRACT

Disclosed herein are methods and compositions of blended polycarbonate resins with improved hydrolytic stability. The resulting compositions, comprising a hydrotalcite and inorganic buffer, can be used in the manufacture of articles while still retaining the advantageous physical properties of blended polycarbonate compositions with improved hydrolytic stability. This abstract is intended as a scanning tool for purposes of searching in the particular art and is not intended to be limiting of the present invention.

39 Claims, No Drawings

(56) References Cited

U.S. PATENT DOCUMENTS

| | | |
|---|---|---|
| 2004/0033890 A1 | 2/2004 | Mihan et al. |
| 2004/0049008 A1 | 3/2004 | Pedersen et al. |
| 2004/0077763 A1 | 4/2004 | Chung et al. |
| 2004/0087711 A1 | 5/2004 | Matsumura et al. |
| 2004/0152808 A1 | 8/2004 | Tezuka et al. |
| 2005/0004292 A1* | 1/2005 | Harashina et al. ............ 524/430 |
| 2005/0222334 A1 | 10/2005 | Srinivasan et al. |
| 2005/0228137 A1 | 10/2005 | Srinivasan et al. |
| 2005/0288517 A1 | 12/2005 | Rai et al. |
| 2006/0079615 A1 | 4/2006 | DeRudder et al. |
| 2006/0089462 A1 | 4/2006 | O et al. |
| 2007/0010619 A1 | 1/2007 | Chatterjee et al. |
| 2007/0055025 A1 | 3/2007 | Rai et al. |
| 2007/0093574 A1 | 4/2007 | Esemplare |
| 2007/0100113 A1 | 5/2007 | Kamps et al. |
| 2007/0100122 A1 | 5/2007 | Crawford et al. |
| 2007/0100125 A1 | 5/2007 | Crawford et al. |
| 2007/0105993 A1 | 5/2007 | Germroth et al. |
| 2007/0106054 A1 | 5/2007 | Crawford et al. |
| 2007/0123682 A1 | 5/2007 | Raj et al. |
| 2007/0123683 A1 | 5/2007 | Arumugam et al. |
| 2007/0129531 A1 | 6/2007 | Germroth et al. |
| 2007/0135612 A1 | 6/2007 | Ganesan et al. |
| 2007/0155881 A1 | 7/2007 | Hirthe et al. |
| 2007/0244242 A1 | 10/2007 | Agarwal et al. |
| 2008/0033123 A1 | 2/2008 | Srinivasan et al. |
| 2008/0058497 A1 | 3/2008 | Ganesan et al. |
| 2008/0293857 A1 | 11/2008 | Crawford et al. |
| 2008/0293882 A1 | 11/2008 | Germroth et al. |
| 2009/0012222 A1 | 1/2009 | Duijzings et al. |
| 2009/0054568 A1 | 2/2009 | Uejima et al. |
| 2009/0093573 A1 | 4/2009 | Germroth et al. |
| 2009/0093574 A1 | 4/2009 | Crawford et al. |
| 2009/0105393 A1 | 4/2009 | Jansen et al. |
| 2009/0105443 A1 | 4/2009 | Brack et al. |
| 2009/0105444 A1 | 4/2009 | Chatterjee et al. |
| 2009/0131571 A1 | 5/2009 | Fraser et al. |
| 2009/0131599 A1 | 5/2009 | Rai et al. |
| 2009/0239991 A1 | 9/2009 | Avtomonov et al. |
| 2009/0305381 A1 | 12/2009 | Bilek et al. |
| 2010/0087574 A1 | 4/2010 | Crawford et al. |
| 2010/0096589 A1 | 4/2010 | Crawford et al. |
| 2010/0099832 A1 | 4/2010 | Jansen et al. |
| 2010/0130643 A1 | 5/2010 | Rohrbach |
| 2010/0152416 A1 | 6/2010 | Bhotla et al. |
| 2010/0184906 A1 | 7/2010 | Davies |
| 2010/0227971 A1 | 9/2010 | Crawford et al. |
| 2010/0273922 A1 | 10/2010 | Fujimoto et al. |
| 2010/0276289 A1 | 11/2010 | Tezuka et al. |
| 2011/0129631 A1 | 6/2011 | Van Nuffel et al. |

FOREIGN PATENT DOCUMENTS

| | | | |
|---|---|---|---|
| EP | 264143 | A1 | 4/1988 |
| EP | 332761 | A2 | 9/1989 |
| EP | 232367 | B1 | 7/1990 |
| EP | 442465 | A2 | 8/1991 |
| EP | 537863 | A1 | 4/1993 |
| EP | 548741 | A2 | 6/1993 |
| EP | 592953 | A1 | 4/1994 |
| EP | 597275 | A1 | 5/1994 |
| EP | 599886 | A1 | 6/1994 |
| EP | 604074 | A1 | 6/1994 |
| EP | 604080 | A1 | 6/1994 |
| EP | 604796 | A1 | 7/1994 |
| EP | 627469 | A1 | 12/1994 |
| EP | 656396 | A1 | 6/1995 |
| EP | 668318 | A1 | 8/1995 |
| EP | 694581 | A2 | 1/1996 |
| EP | 694582 | A2 | 1/1996 |
| EP | 714704 | A1 | 6/1996 |
| EP | 800555 | B1 | 10/1998 |
| EP | 924259 | A1 | 6/1999 |
| EP | 943409 | A1 | 9/1999 |
| EP | 969049 | A2 | 1/2000 |
| EP | 979845 | A1 | 2/2000 |
| EP | 1070750 | A2 | 1/2001 |
| EP | 796287 | B1 | 3/2001 |
| EP | 1122278 | A2 | 8/2001 |
| EP | 902810 | B1 | 1/2003 |
| EP | 1272565 | B1 | 1/2003 |
| EP | 1402016 | B1 | 3/2004 |
| EP | 1402024 | B1 | 3/2004 |
| EP | 1414888 | B1 | 5/2004 |
| EP | 1418198 | A1 | 5/2004 |
| EP | 1165676 | B1 | 11/2004 |
| EP | 1501565 | B1 | 2/2005 |
| EP | 1582549 | A1 | 10/2005 |
| EP | 1801176 | A1 | 6/2007 |
| EP | 1876206 | A1 | 1/2008 |
| EP | 1932885 | A1 | 6/2008 |
| EP | 1940907 | B1 | 7/2008 |
| EP | 1940908 | B1 | 7/2008 |
| EP | 1979404 | B1 | 3/2010 |
| EP | 2174991 | A1 | 4/2010 |
| EP | 2177573 | A1 | 4/2010 |
| EP | 2189497 | A1 | 5/2010 |
| EP | 1954741 | B1 | 12/2010 |
| EP | 2332592 | A1 | 6/2011 |
| GB | 110456 | A | 10/1917 |
| WO | WO-8700850 | A1 | 2/1987 |
| WO | WO-9118116 | A1 | 11/1991 |
| WO | WO-9304099 | A1 | 3/1993 |
| WO | WO-9602563 | A1 | 2/1996 |
| WO | WO-9745484 | A1 | 12/1997 |
| WO | WO-9947318 | A1 | 9/1999 |
| WO | WO-02096979 | A2 | 12/2002 |
| WO | WO-02103008 | A2 | 12/2002 |
| WO | WO-03010220 | A1 | 2/2003 |
| WO | WO-03060035 | A1 | 7/2003 |
| WO | WO-03094990 | A1 | 11/2003 |
| WO | WO-2006012162 | A2 | 2/2006 |
| WO | WO-2006/044257 | A1 | 4/2006 |
| WO | WO-2007053357 | A2 | 5/2007 |
| WO | WO-2007053434 | A1 | 5/2007 |
| WO | WO-2007053548 | A2 | 5/2007 |
| WO | WO-2007053549 | A1 | 5/2007 |
| WO | WO-2007053550 | A1 | 5/2007 |
| WO | WO-2007064569 | A2 | 6/2007 |
| WO | WO-2007070528 | A1 | 6/2007 |
| WO | WO-2007089598 | A1 | 8/2007 |
| WO | WO-2007104107 | A1 | 9/2007 |
| WO | WO-2007139653 | A1 | 12/2007 |
| WO | WO-2007139655 | A1 | 12/2007 |
| WO | WO-2008001097 | A1 | 1/2008 |
| WO | WO-2008149156 | A1 | 12/2008 |
| WO | WO-2009050682 | A2 | 4/2009 |
| WO | WO-2009052463 | A1 | 4/2009 |
| WO | WO-2010017067 | A1 | 2/2010 |
| WO | WO-2010058343 | A1 | 5/2010 |
| WO | WO-2010067330 | A1 | 6/2010 |

OTHER PUBLICATIONS

N. Bejoy, "Hydrotalcite—The Clay that Cures," Resonance, Feb. 2001, pp. 57-61.

Sasol, "Hyrdotalcite—Pural MG," Product Information, undated reference, pp. 1-4.

Padmasri et al., "Calcined Mg-Al, Mg-Cr and Zn-Al hydrotalcite catalysts for tert-butylation of phenol with iso-butanol-a comparative study," Journal of Molecular Catalysis A: Chemical 188 (2002) pp. 255-265.

Trakarnpruk et al., "Palm oil biodiesel synthesized with potassium loaded calcined hydrotalcite and effect of biodiesel blend on elastomer properties," Renewable Energy, vol. 33, Issue 7, Jul. 2008, pp. 1558-1563.

* cited by examiner

HYDROLYTIC STABILITY IN POLYCARBONATE COMPOSITIONS

FIELD OF THE INVENTION

The present invention relates to polycarbonate compositions having improved hydrolytic stability that include polycarbonate/acrylonitrile-butadiene-styrene compositions having improved hydrolytic stability.

BACKGROUND OF THE INVENTION

Polycarbonate resins form many blends with emulsion derived vinyl polymers that have useful features, such as high impact, high melt flow, good appearance and improved solvent resistance. However the nature of the vinyl polymers made by an emulsion process creates specific issues with the stability of the polycarbonate (PC) resin used in blends with them. PC is a condensation polymer with carbonic acid ester repeat units. These carbonate linkages can react with water causing the polymer to lose molecular weight and ultimately physical properties. Various catalysts, such as acids and bases or chemical remnants of the emulsion polymerization process that may generate undesired catalysts when the blend is melt processed by molding or extrusion, may increase the rate of PC hydrolysis. PC resins are relatively sensitive to degradation and are somewhat unusual for condensation polymers in that when they decompose they can give off carbon dioxide, derived from the carbonate linkages. Carbon dioxide generation can cause the PC blend to foam or give a plastic part whose surface is marred by splay, due to carbon dioxide. Such decomposition leaves behind a phenolic end group.

The use of specific process aids such as emulsifiers and coagulation agents in emulsion polymerization process may cause decomposition of PC. For instance, residues of the emulsifier, such as fatty carboxylic acids or their salts can cause issues, with PC stability. In addition emulsion polymerized resins must be separated from the water in which they are made. This separation is frequently done by coagulation; addition of salt water or acid is often used, along with filtration, to separate the emulsion polymer from water. Despite this separation the emulsion polymers often contain varying minor amounts of residues that may cause PC instability. In many cases it is not industrially or economically feasible to totally purify the emulsion polymer from such by-products of its manufacture. For instance in an acid or salt coagulated emulsion polymer, excessive washing may be needed to purify the polymer such that it can be used in a PC blend in demanding conditions. However this extra washing may require excessive water leading to increased pollution and or higher treatment costs. In other instances the use of emulsion polymerization adjuncts, such as emulsifier and radical initiators is critical to a successful emulsion polymerization and cannot be removed or substituted for. Therefore it would be beneficial to be able to use the emulsion polymers, as they are isolated from polymerization, in combination with PC. However in demanding applications, such as exposure to humidity at high temperature, the residues of the emulsion polymerization process can lead to PC breakdown.

Accordingly, it would be beneficial to provide polycarbonate compositions that have improved hydrolytic stability.

SUMMARY OF THE INVENTION

In one aspect, the invention relates to hydrolytically-stabilized polycarbonate compositions comprising a polycarbonate polymer and a hydrolytic stabilizer composition comprising a hydrotalcite and an inorganic buffer salt. The hydrolytic stabilizer improves the stability of polymer compositions comprising polycarbonate polymers to hydrolytic decomposition in the presence of heat and humidity, particularly under acidic or basic environments. Thus, in a further aspect, the resulting compositions are therefore capable of being used in the production of articles wherein exposure high temperature and humidity is important to overall product performance.

In a further aspect, described herein are blended polycarbonate compositions with improved hydrolytic stability comprising:
(a) a hydrolytic stabilizer composition comprising:
  i. from about 0.1 pph to about 1 pph of a hydrotalcite;
  ii. from about 0.1 pph to about 1 pph of an inorganic buffer salt;
(b) from about 20 pph to about 90 pph of at least one polycarbonate polymer composition;
(c) from about 5 pph to about 50 pph of at least one impact modifier composition; and
(d) pph balance of a polymer composition additives;
wherein the composition exhibits hydrolytic stability with at least about 25% greater weight average molecular weight retention than that of a reference composition consisting essentially of substantially the same proportions of the same polycarbonate polymer composition and the same acrylonitrile-butadiene-styrene (ABS) polymer composition, in the absence of the same hydrotalcite and the same inorganic salt buffer solution.

In a further aspect, described herein are blended polycarbonate compositions comprising at least one polycarbonate polymer composition, at least one impact modifier, and a hydrolytic composition, wherein the hydrolytic stabilizer comprises at least one hydrotalcite and at least one inorganic buffer salt, wherein the hydrolytic stabilizer is present in an amount effective to provide hydrolytic stability.

In an even further aspect, described herein are processes to improve the hydrolytic stability of blended polycarbonate compositions comprising the addition of an effective amount of a hydrolytic stabilizer, wherein the hydrolytic stabilizer comprises at least one hydrotalcite and at least one inorganic buffer salt, to increase the hydrolytic stability by at least about 25% greater than that of a reference composition consisting essentially of substantially the same proportions of the same polycarbonate polymer composition and the same acrylonitrile-butadiene-styrene (ABS) polymer composition, in the absence of the same hydrotalcite and the same inorganic salt.

Additional advantages of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION OF THE INVENTION

The present invention can be understood more readily by reference to the following detailed description of the invention and the Examples included therein.

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. Although any methods and materials similar or equivalent to those described herein can be used in the practice or testing of the present invention, example methods and materials are now described.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

All publications mentioned herein are incorporated herein by reference to disclose and describe the methods and/or materials in connection with which the publications are cited.

Definitions

It is also to be understood that the terminology used herein is for the purpose of describing particular aspects only and is not intended to be limiting. As used in the specification and in the claims, the term "comprising" may include the embodiments "consisting of" and "consisting essentially of." Unless defined otherwise, all technical and scientific terms used herein have the same meaning as commonly understood by one of ordinary skill in the art to which this invention belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "a functional group," "an alkyl," or "a residue" includes mixtures of two or more such functional groups, alkyls, or residues, and the like. Furthermore, for example, reference to a filler includes mixtures of fillers.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "optional" or "optionally" means that the subsequently described event or circumstance can or can not occur, and that the description includes instances where said event or circumstance occurs and instances where it does not. For example, the phrase "optionally substituted alkyl" means that the alkyl group can or can not be substituted and that the description includes both substituted and unsubstituted alkyl groups.

As used herein, the term "effective amount" refers to an amount that is sufficient to achieve the desired modification of a physical property of the composition or material. For example, an "effective amount" of a hydrolytic stabilizer refers to an amount that is sufficient to achieve the desired improvement in hydrolytic stability under applicable test conditions. The specific level in terms of wt % in a composition required as an effective amount will depend upon a variety of factors including the amount and type of hydrolytic stabilizer, amount and type of polycarbonate polymer compositions, amount and type of impact modifier compositions, and end use of the article made using the composition.

Disclosed are the components to be used to prepare the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds can not be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific aspect or combination of aspects of the methods of the invention.

References in the specification and concluding claims to parts by weight, of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included. For example if a particular element or component in a composition or article is said to have 8% weight, it is understood that this percentage is relation to a total compositional percentage of 100%.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group. Unless defined otherwise, technical and scientific terms used herein have the same meaning as is commonly understood by one of skill in the art to which this invention belongs.

The term "alkyl group" as used herein is a branched or unbranched saturated hydrocarbon group of 1 to 24 carbon atoms, such as methyl, ethyl, n-propyl, isopropyl, n-butyl, isobutyl, t-butyl, pentyl, hexyl, heptyl, octyl, decyl, tetradecyl, hexadecyl, eicosyl, tetracosyl and the like. A "lower alkyl" group is an alkyl group containing from one to six carbon atoms.

The term "alkoxy" as used herein is an alkyl group bound through a single, terminal ether linkage; that is, an "alkoxy" group can be defined as —OR where R is alkyl as defined above. A "lower alkoxy" group is an alkoxy group containing from one to six carbon atoms.

The term "alkenyl group" as used herein is a hydrocarbon group of from 2 to 24 carbon atoms and structural formula containing at least one carbon-carbon double bond. Asymmetric structures such as (AB)C=C(CD) are intended to include both the E and Z isomers. This can be presumed in structural formulae herein wherein an asymmetric alkene is present, or it can be explicitly indicated by the bond symbol C.

The term "alkynyl group" as used herein is a hydrocarbon group of 2 to 24 carbon atoms and a structural formula containing at least one carbon-carbon triple bond.

The term "aryl group" as used herein is any carbon-based aromatic group including, but not limited to, benzene, naphthalene, etc. The term "aromatic" also includes "heteroaryl group," which is defined as an aromatic group that has at least one heteroatom incorporated within the ring of the aromatic group. Examples of heteroatoms include, but are not limited to, nitrogen, oxygen, sulfur, and phosphorus. The aryl group can be substituted or unsubstituted. The aryl group can be substituted with one or more groups including, but not limited to, alkyl, alkynyl, alkenyl, aryl, halide, nitro, amino, ester, ketone, aldehyde, hydroxy, carboxylic acid, or alkoxy.

The term "cycloalkyl group" as used herein is a non-aromatic carbon-based ring composed of at least three carbon atoms. Examples of cycloalkyl groups include, but are not limited to, cyclopropyl, cyclobutyl, cyclopentyl, cyclohexyl, etc. The term "heterocycloalkyl group" is a cycloalkyl group as defined above where at least one of the carbon atoms of the ring is substituted with a heteroatom such as, but not limited to, nitrogen, oxygen, sulfur, or phosphorus.

The term "aralkyl" as used herein is an aryl group having an alkyl, alkynyl, or alkenyl group as defined above attached to the aromatic group. An example of an aralkyl group is a benzyl group.

The term "hydroxyalkyl group" as used herein is an alkyl, alkenyl, alkynyl, aryl, aralkyl, cycloalkyl, halogenated alkyl, or heterocycloalkyl group described above that has at least one hydrogen atom substituted with a hydroxyl group.

The term "alkoxyalkyl group" is defined as an alkyl, alkenyl, alkynyl, aryl, aralkyl, cycloalkyl, halogenated alkyl, or heterocycloalkyl group described above that has at least one hydrogen atom substituted with an alkoxy group described above.

The term "ester" as used herein is represented by the formula —C(O)OA, where A can be an alkyl, halogenated alkyl, alkenyl, alkynyl, aryl, heteroaryl, cycloalkyl, cycloalkenyl, heterocycloalkyl, or heterocycloalkenyl group described above.

The term "carbonate group" as used herein is represented by the formula —OC(O)OR, where R can be hydrogen, an alkyl, alkenyl, alkynyl, aryl, aralkyl, cycloalkyl, halogenated alkyl, or heterocycloalkyl group described above.

The term "carboxylic acid" as used herein is represented by the formula —C(O)OH.

The term "aldehyde" as used herein is represented by the formula —C(O)H.

The term "keto group" as used herein is represented by the formula —C(O)R, where R is an alkyl, alkenyl, alkynyl, aryl, aralkyl, cycloalkyl, halogenated alkyl, or heterocycloalkyl group described above.

The term "carbonyl group" as used herein is represented by the formula C=O.

The term "ether" as used herein is represented by the formula AOA$^1$, where A and A$^1$ can be, independently, an alkyl, halogenated alkyl, alkenyl, alkynyl, aryl, heteroaryl, cycloalkyl, cycloalkenyl, heterocycloalkyl, or heterocycloalkenyl group described above.

The term "sulfo-oxo group" as used herein is represented by the formulas —S(O)$_2$R, —OS(O)$_2$R, or, —OS(O)$_2$OR, where R can be hydrogen, an alkyl, alkenyl, alkynyl, aryl, aralkyl, cycloalkyl, halogenated alkyl, or heterocycloalkyl group described above.

Each of the materials disclosed herein are either commercially available and/or the methods for the production thereof are known to those of skill in the art.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

Blended Polycarbonate Compositions

As briefly described above, the present invention relates in one aspect to blended polycarbonate compositions with improved hydrolytic stability. In one aspect, the invention relates blended polycarbonate compositions with improved hydrolytic stability comprising:
 (a) a hydrolytic stabilizer composition comprising:
  iii. from about 0.1 pph to about 1 pph of a hydrotalcite;
  iv. from about 0.1 pph to about 1 pph of an inorganic buffer salt;
 (b) from about 20 pph to about 90 pph of at least one polycarbonate polymer composition;
 (c) from about 5 pph to about 50 pph of at least one impact modifier composition; and
 (d) pph balance of a polymer composition additives;
wherein the composition exhibits hydrolytic stability with at least about 25% greater weight average molecular weight retention than that of a reference composition consisting essentially of substantially the same proportions of the same polycarbonate polymer composition and the same acrylonitrile-butadiene-styrene (ABS) polymer composition, in the absence of the same hydrotalcite and the same inorganic salt buffer solution. In a further aspect, described herein are articles made from the disclosed compositions.

In a further aspect, the hydrotalcite is a calcined hydrotalcite. In a still further aspect, the hydrotalcite has the formula represented by $Mg_{4.5}Al_{1.5}(OH)_{12}(CO_3)_{0.8}(Al_2-O_3)$.

In a further aspect, the hydrotalcite is present in amount from about 0.20 pph to about 0.90 pph. In a still further aspect, the hydrotalcite is present in amount from about 0.30 pph to about 0.90 pph. In a yet further aspect, the hydrotalcite is present in amount from about 0.40 pph to about 0.90 pph. In an even further aspect, the hydrotalcite is present in amount from about 0.50 pph to about 0.90 pph. In a still further aspect, the hydrotalcite is present in amount from about 0.20 pph to about 0.50 pph. In an even further aspect, the hydrotalcite is present in amount from about 0.30 pph to about 0.60 pph. In a yet further aspect, the hydrotalcite is present of about 0.20 pph, about 0.30 pph, about 0.38 pph, about 0.40 pph, about 0.50 pph, about 0.60 pph, about 0.70 pph, about 0.75 pph, about 0.80 pph, or about 90 pph.

In various aspects, the inorganic buffer salt is an aqueous inorganic buffer solution. In a further aspect, the aqueous inorganic buffer solution has a pH from about 5.0 to about 7.0. In a still further aspect, the aqueous inorganic buffer solution has a pH from about 6.0 to about 7.0. In a yet further aspect, the aqueous inorganic buffer solution has a pH of about 6.8. In an even further aspect, the aqueous inorganic buffer solution has a pH less than or equal to about 7.0. In a yet further aspect, the aqueous inorganic buffer solution has a concentration of about 0.25 M to about 1.0 M. In an even further aspect, the aqueous inorganic buffer solution has a concentration of about 0.5 M.

In a further aspect, the aqueous inorganic buffer solution is a phosphate buffer solution. In a still further aspect, the phosphate buffer solution comprises $NaH_2PO_4$ and $Na_2HPO_4$. In a yet further aspect, the phosphate buffer solution has a pH from about 5.0 to about 7.0. In an even further aspect, the phosphate buffer solution has a pH from about 6.0 to about 7.0. In a still further aspect, the phosphate buffer solution has a pH of about 6.8. In a yet further aspect, the phosphate buffer solution has a concentration from about 0.25 to about 1.0 M. In an even further aspect, the phosphate buffer solution has a concentration of about 0.5 M. In a still further aspect, the aqueous inorganic buffer solution is a phosphate buffer solution comprising $NaH_2PO_4$ and $Na_2HPO_4$, and wherein the aqueous inorganic buffer solution has a concentration of about 0.5M and a pH of about 6.8.

In a further aspect, the at least one polycarbonate polymer composition is present in an amount of about 40 pph to about 80 pph. In a yet further aspect, the at least one polycarbonate polymer composition is present in an amount of about 50 pph to about 75 pph. In a still further aspect, the at least one polycarbonate polymer composition is present in an amount less than or equal to about 95 pph. In an even further aspect, the at least one polycarbonate polymer composition is present in an amount less than or equal to about 90 pph. In a yet further aspect, the at least one polycarbonate polymer composition is present in an amount less than or equal to about 85 pph. In a still further aspect, the at least one polycarbonate polymer composition is present in an amount less than or equal to about 80 pph.

In a further aspect, the polycarbonate polymer is present in an amount from about 45 pph to about 80 pph. In a still further aspect, the polycarbonate polymer is present in an amount from about 45 pph to about 70 pph. In a yet further aspect, the polycarbonate polymer is present in an amount from about 45 pph to about 55 pph. In an even further aspect, the polycarbonate polymer is present in an amount from about 65 pph to about 85 pph.

In a further aspect, the at least one impact modifier composition is present in an amount of about 10 pph to about 45 pph. In a yet further aspect, the at least one impact modifier composition is present in an amount of about 15 pph to about 35 pph. In a still further aspect, the at least one impact modifier composition is present in an amount of about 45 pph to about 55 pph.

In a further aspect, the impact modifier comprises at least one acrylonitrile-butadiene-styrene (ABS) polymer composition. In a yet further aspect, the ABS polymer composition is present in an amount from about 5 pph to about 50 pph. In a still further aspect, the ABS polymer composition is present in an amount of about 10 pph to about 45 pph. In a yet further aspect, the ABS polymer composition is present in an amount of about pph to about 35 pph. In an even further aspect, the ABS polymer composition is present in an amount of about 45 pph to about 55 pph. In a still further aspect, the ABS polymer composition is present in an amount from about 2.5 pph to about 10 pph. In a yet further aspect, the ABS polymer composition is present in an amount of at least about 2.5 pph, at least 5 pph, at least about 7.5 pph, at least about 10 pph, at least about 15 pph, at least about pph, at least about 25 pph, at least about 30 pph, or at least about 35 pph. In an even further aspect, the ABS polymer composition is present in an amount of about 5 pph.

In a further aspect, the butadiene content of the ABS polymer is from about 20% to about 75%. In a still further aspect, the butadiene content of the ABS polymer is from about 30% to about 65%. In an even further aspect, the butadiene content of the ABS polymer is at least about 20%, at least about 25%, at least about 30%, at least about 35%, at least about 40%, at least about 45%, at least about 50%, at least about 55%, at least about 60%, at least about 65%, or at least about 75%.

In a further aspect, the ABS polymer composition is a SAN grafted emulsion ABS. In a yet further aspect, the SAN grafted emulsion ABS has a butadiene content from about 20% to about 75%. In an even further aspect, the SAN grafted emulsion ABS has a butadiene content from about 30% to about 55%. In a yet further aspect, the SAN grafted emulsion ABS has a butadiene content from about 45% to about 55%. In a still further aspect, the SAN grafted emulsion ABS has a butadiene content from about 30% to about 32%. In an even further aspect, the SAN grafted emulsion ABS has a butadiene content of about 31%. In a still further aspect, the SAN grafted emulsion ABS has a butadiene content from about 45% to about 55%. In a yet further aspect, the SAN grafted emulsion ABS has a butadiene content of about 50%.

In a further aspect, the ABS polymer composition further comprises a first ABS polymer composition component and a second ABS polymer composition component. In a yet further aspect, the first ABS polymer composition component is present in an amount from about 30 pph to about 50 pph. In a still further aspect, the first ABS polymer composition component is present in an amount from about 30 pph to about 50 pph. In a yet further aspect, the first ABS polymer composition component is present in an amount from about 45 pph to about 55 pph. In an even further aspect, the first ABS polymer composition component is present in an amount from about 35 pph to about 45 pph. In a still further aspect, the first ABS polymer composition component is present in an amount from about 40 pph to about 50 pph. In a yet further aspect, the first ABS polymer composition component is present in an amount from about 38 pph to about 43 pph. In an even further aspect, the first ABS polymer composition component is present in an amount of about 38 pph. In a still further aspect, first ABS polymer composition component is present in an amount of about 39 pph, of about 40 pph, of about 41 pph, of about 42 pph, or of about 43 pph.

In a further aspect, the first ABS polymer composition component has a butadiene content from about 20% to about 75%. In a still further aspect, the first ABS polymer composition component has a butadiene content from about 30% to about 65%. In a yet further aspect, the first ABS polymer composition component has a butadiene content from about 25% to about 40%. In an even further aspect, the first ABS polymer composition component has a butadiene content from about 25% to about 35%. In a still further aspect, the first ABS polymer composition component has a butadiene content is about 25%, about 27%, about 29%, about 30%, about 31%, about 32%, or about 33%.

In a further aspect, the second ABS polymer composition component has a butadiene content from about 20% to about 75%. In a still further aspect, the second ABS polymer composition component has a butadiene content from about 30% to about 65%. In a yet further aspect, the second ABS polymer composition component has a butadiene content from about 40% to about 65%. In an even further aspect, the second ABS polymer composition component has a butadiene content from about 50% to about 65%. In a still further aspect, the second ABS polymer composition component has a butadiene content is about 45%, about 47%, about 49%, about 50%, about 55%, about 57%, about 60%, about 61%, about 62%, about 63%, about 64%, or about 65%.

In a further aspect, the second ABS polymer composition component is present in an amount from about 1 pph to about 10 pph. In a still further aspect, the second ABS polymer composition component is present in an amount from about 2 pph to about 8 pph. In a yet further aspect, the second ABS polymer composition component is present in an amount from about 3 pph to about 7 pph. In an even further aspect, the second ABS polymer composition component is present in an amount from about 4 pph to about 6 pph. In a still further aspect, the second ABS polymer composition component is present in an amount of about 3 pph, about 4 pph, about 5 pph, about 6 pph, about 7 pph, about 8 pph, or about 9 pph.

In a further aspect, the first ABS polymer composition component is present in an amount from about 30 pph to about 50 pph; and the second ABS polymer composition component is present in an amount from about 1 pph to about 10 pph. In a still further aspect, the first ABS polymer composition component is present in an amount from about 35 pph to about 45 pph; and the second ABS polymer composition component is present in an amount from about 2 pph to about 8 pph. In a yet further aspect, the first ABS polymer composition component is present in an amount from about 38 pph to about 43 pph; and the second ABS polymer composition component is present in an amount from about 3 pph to about 7 pph. In an even further aspect, the first ABS polymer composition component is present in an amount of about 41 pph; and wherein the second ABS polymer composition component is present in an amount of about 5 pph.

In a further aspect, the impact modifier comprises at least one methacrylate-butadiene-styrene (MBS) polymer composition.

In a further aspect, the impact modifier comprises at least one acrylonitrile-butadiene-styrene (ABS) polymer composition and at least one methacrylate-butadiene-styrene (MBS) polymer composition.

In a further aspect, the first ABS polymer composition component is present in an amount from about 30 pph to about 50 pph; and the MBS polymer composition is present in an amount from about 1 pph to about 10 pph. In a still further aspect, the first ABS polymer composition component is present in an amount from about 35 pph to about 45 pph; and the MBS polymer composition is present in an amount from about 2 pph to about 8 pph. In a yet further aspect, the first ABS polymer composition component is present in an amount from about 38 pph to about 43 pph; and the MBS polymer composition is present in an amount from about 3 pph to about 7 pph. In an even further aspect, first ABS polymer composition component is present in an amount of about 41 pph; and the MBS polymer composition is present in an amount of about 5 pph.

In a further aspect, the MBS polymer composition is present in an amount from about 1 pph to about 10 pph. In a still further aspect, the MBS polymer composition is present in an amount from about 2 pph to about 8 pph. In a yet further aspect, the MBS polymer composition is present in an amount from about 3 pph to about 7 pph. In a still further aspect, the MBS polymer composition is present in an amount from about 4 pph to about 6 pph. In an even further aspect, the MBS polymer composition is present in an amount of 3 pph, about 4 pph, about 5 pph, about 6 pph, about 7 pph, about 8 pph, or about 9 pph. In a yet further aspect, the MBS polymer composition is present in an amount of 5 pph.

In a further aspect, the composition further comprises a SAN copolymer present in an amount from greater than 0 pph to about 50 pph of SAN copolymer. In a still further aspect, the SAN copolymer is present in an amount of about 5 pph to about 50 pph. In an even further aspect, the SAN copolymer is present in an amount of about 10 pph to about 45 pph. In a yet further aspect, the SAN copolymer is present in an amount of about 15 pph to about 35 pph. In a still further aspect, the SAN copolymer is not present. In an even further aspect, the SAN copolymer is present in an amount less than or equal to about 1 pph.

In a further aspect, the hydrolytic stability is determined in a hydrolytic aging chamber for at least 500 hours at temperature from about 70° C. to about 90° C. with a relative humidity from about 60% to about 95%. In a still further aspect, the hydrolytic stability is determined in a hydrolytic aging chamber for at least 750 hours at temperature from about 70° C. to about 90° C. with a relative humidity from about 60% to about 95%. In a yet further aspect, the hydrolytic stability is determined in a hydrolytic aging chamber for at least 1000 hours at temperature from about 70° C. to about 90° C. with a relative humidity from about 60% to about 95%. In an even further aspect, the hydrolytic stability is determined in a hydrolytic aging chamber for 1000 hours at temperature of about 80° C. with a relative humidity of about 70%.

In a further aspect, the hydrolytic stability is determined in a hydrolytic aging chamber for at least 500 hours at temperature from about 70° C. to about 90° C. with a relative humidity from about 80% to about 95%. In a still further aspect, the hydrolytic stability is determined in a hydrolytic aging chamber for at least 750 hours at temperature from about 70° C. to about 90° C. with a relative humidity from about 80% to about 95%. In a yet further aspect, the hydrolytic stability is determined in a hydrolytic aging chamber for at least 1000 hours at temperature from about 70° C. to about 90° C. with a relative humidity from about 80% to about 95%. In an even further aspect, the hydrolytic stability is determined in a hydrolytic aging chamber for 1000 hours at temperature of about 80° C. with a relative humidity of about 70%.

In a further aspect, the hydrolytic stability with at least 25% greater weight average molecular weight retention than that of a reference composition consisting essentially of substantially the same proportions of the same polycarbonate polymer composition and the same acrylonitrile-butadiene-styrene (ABS) polymer composition, in the absence of the same hydrotalcite and the same inorganic salt when the hydrolytic stability is determined in a hydrolytic aging chamber for 1000 hours at temperature of about 80° C. with a relative humidity of about 70%.

In a further aspect, the hydrolytic stability with at least 30% greater weight average molecular weight retention than that of a reference composition consisting essentially of substantially the same proportions of the same polycarbonate polymer composition and the same acrylonitrile-butadiene-styrene (ABS) polymer composition, in the absence of the same hydrotalcite and the same inorganic salt when the hydrolytic stability is determined in a hydrolytic aging chamber for 1000 hours at temperature of about 80° C. with a relative humidity of about 70%.

In a further aspect, the hydrolytic stability with at least 35% greater weight average molecular weight retention than that of a reference composition consisting essentially of substantially the same proportions of the same polycarbonate polymer composition and the same acrylonitrile-butadiene-styrene (ABS) polymer composition, in the absence of the same hydrotalcite and the same inorganic salt when the hydrolytic stability is determined in a hydrolytic aging chamber for 1000 hours at temperature of about 80° C. with a relative humidity of about 70%.

In a further aspect, the hydrolytic stability with at least 40% greater weight average molecular weight retention than that of a reference composition consisting essentially of substantially the same proportions of the same polycarbonate polymer composition and the same acrylonitrile-butadiene-styrene (ABS) polymer composition, in the absence of the same hydrotalcite and the same inorganic salt when the hydrolytic stability is determined in a hydrolytic aging chamber for 1000 hours at temperature of about 80° C. with a relative humidity of about 70%.

In a further aspect, the hydrolytic stability with at least 45% greater weight average molecular weight retention than that of a reference composition consisting essentially of substantially the same proportions of the same polycarbonate polymer composition and the same acrylonitrile-butadiene-styrene (ABS) polymer composition, in the absence of the same hydrotalcite and the same inorganic salt when the hydrolytic stability is determined in a hydrolytic aging chamber for 1000 hours at temperature of about 80° C. with a relative humidity of about 70%.

In a further aspect, the hydrolytic stability with at least 50% greater weight average molecular weight retention than that of a reference composition consisting essentially of substantially the same proportions of the same polycarbonate polymer composition and the same acrylonitrile-butadiene-styrene (ABS) polymer composition, in the absence of the same hydrotalcite and the same inorganic salt when the hydrolytic stability is determined in a hydrolytic aging chamber for 1000 hours at temperature of about 80° C. with a relative humidity of about 70%.

In a further aspect, the hydrolytic stability with at least 55% greater weight average molecular weight retention than that of a reference composition consisting essentially of substantially the same proportions of the same polycarbonate polymer composition and the same acrylonitrile-butadiene-styrene (ABS) polymer composition, in the absence of the same hydrotalcite and the same inorganic salt when the hydrolytic stability is determined in a hydrolytic aging chamber for 1000 hours at temperature of about 80° C. with a relative humidity of about 70%.

In a further aspect, the hydrolytic stability with at least 60% weight average molecular weight retention greater than that of a reference composition consisting essentially of substantially the same proportions of the same polycarbonate polymer composition and the same acrylonitrile-butadiene-styrene (ABS) polymer composition, in the absence of the same hydrotalcite and the same inorganic salt when the hydrolytic stability is determined in a hydrolytic aging chamber for 1000 hours at temperature of about 80° C. with a relative humidity of about 70%.

In a further aspect, the hydrolytic stability with at least 65% greater weight average molecular weight retention than that of a reference composition consisting essentially of substantially the same proportions of the same polycarbonate polymer composition and the same acrylonitrile-butadiene-styrene (ABS) polymer composition, in the absence of the same hydrotalcite and the same inorganic salt when the hydrolytic stability is determined in a hydrolytic aging chamber for 1000 hours at temperature of about 80° C. with a relative humidity of about 70%.

In a further aspect, the hydrolytic stability with at least 70% greater weight average molecular weight retention than that of a reference composition consisting essentially of substantially the same proportions of the same polycarbonate polymer composition and the same acrylonitrile-butadiene-styrene (ABS) polymer composition, in the absence of the same hydrotalcite and the same inorganic salt when the hydrolytic stability is determined in a hydrolytic aging chamber for 1000 hours at temperature of about 80° C. with a relative humidity of about 70%.

In a further aspect, the hydrolytic stability with at least 75% greater weight average molecular weight retention than that of a reference composition consisting essentially of substantially the same proportions of the same polycarbonate polymer composition and the same acrylonitrile-butadiene-styrene (ABS) polymer composition, in the absence of the same hydrotalcite and the same inorganic salt when the hydrolytic stability is determined in a hydrolytic aging chamber for 1000 hours at temperature of about 80° C. with a relative humidity of about 70%.

In a further aspect, the hydrolytic stability with at least 85% greater weight average molecular weight retention than that of a reference composition consisting essentially of substantially the same proportions of the same polycarbonate polymer composition and the same acrylonitrile-butadiene-styrene (ABS) polymer composition, in the absence of the same hydrotalcite and the same inorganic salt when the hydrolytic stability is determined in a hydrolytic aging chamber for 1000 hours at temperature of about 80° C. with a relative humidity of about 70%.

In a further aspect, the hydrolytic stability with at least 85% greater weight average molecular weight retention than that of a reference composition consisting essentially of substantially the same proportions of the same polycarbonate polymer composition and the same acrylonitrile-butadiene-styrene (ABS) polymer composition, in the absence of the same hydrotalcite and the same inorganic salt when the hydrolytic stability is determined in a hydrolytic aging chamber for 1000 hours at temperature of about 80° C. with a relative humidity of about 70%.

In a further aspect, the polymer composition additive comprises one or more of a colorant, anti-oxidant, mold release agent, lubricant, flame retardant agent, smoke suppressor agent, or anti-drip agent.

In a further aspect, the composition further comprises at least one anti-oxidant. In a yet further aspect, the anti-oxidant is present in an amount from about 0.001 pph to about 0.500 pph. In a still further aspect, the anti-oxidant is selected from hindered phenols, phosphites, phosphonites, thioesters and any mixture thereof. In an even further aspect, the composition further comprises at least one primary anti-oxidant and at least one secondary anti-oxidant. In a yet further aspect, the antioxidant comprises at least one anti-oxidant selected from tris(2,4-di-tert-butylphenyl)phosphite, pentaerythritol betalaurylthiopropionate, and octadecyl3(3,5-di-tert-butyl-4-hydroxyphenyl)propionate. In an even further aspect, the anti-oxidant comprises tris(2,4-di-tert-butylphenyl)phosphite is present in an amount from about 0.02 pph to about 1.0 pph, pentaerythritol betalaurylthiopropionate is present in an amount from 0.02 to about 1.0 pph, and octadecyl3(3,5-di-tert-butyl-4-hydroxyphenyl)propionate is present in an amount from about 0.02 pph to about 1.5 pph. In a still further aspect, the antioxidant comprises tris(2,4-di-tert-butylphenyl)phosphite is present in an amount from about 0.05 pph to about 0.3 pph, pentaerythritol betalaurylthiopropionate is present in an amount from 0.1 to about 0.5 pph, and octadecyl3(3,5-di-tert-butyl-4-hydroxyphenyl)propionate is present in an amount from about 0.1 pph to about 0.7 pph. In a yet further aspect, the antioxidant comprises tris(2,4-di-tert-butylphenyl)phosphite is present in an amount from about 0.05 pph to about 0.2 pph, pentaerythritol betalaurylthiopropionate is present in an amount from 0.1 to about 0.4 pph, and octadecyl3(3,5-di-tert-butyl-4-hydroxyphenyl)propionate is present in an amount from about 0.2 pph to about 0.5 pph. In an even further aspect, the antioxidant comprises tris(2,4-di-tert-butylphenyl)phosphite is present in an amount of about 0.1 pph, pentaerythritol betalaurylthiopropionate is present in an amount of about 0.2 pph, and octadecyl-3-(3,5-di-tert-butyl-4-hydroxyphenyl)propionate is present in an amount of about 0.3 pph.

In a further aspect, the composition further comprises at least one mold release agent. In a still further aspect, the composition further comprises a colorant in an amount from about 0.011 pph to about 5.000 pph. In a yet further aspect, the colorant is selected from the group consisting of carbon black and titanium dioxide. In an even further aspect, the colorant is titanium dioxide. In a still further aspect, the titanium dioxide is encapsulated with a silica alumino layer that is passivated with a silicon containing compound. In a yet further aspect, the colorant is carbon black.

In various aspects, the present invention pertains to a blended polycarbonate composition with improved hydrolytic stability comprising at least one polycarbonate polymer composition, at least one impact modifier, and a hydrolytic composition, wherein the hydrolytic stabilizer comprises at least one hydrotalcite and at least one inorganic buffer, wherein the hydrolytic stabilizer is present in an amount effective to provide hydrolytic stability. In a still further aspect, the hydrolytic stability of the polycarbonate composition with at least 25% greater weight average molecular weight retention than that of a reference composition consisting essentially of substantially the same proportions of the same polycarbonate polymer composition and the same acrylonitrile-butadiene-styrene (ABS) polymer composition, in the absence of the same hydrotalcite and the same inorganic salt when the hydrolytic stability is determined in a hydrolytic aging chamber for 1000 hours at temperature of about 80° C. with a relative humidity of about 70%. In a yet further aspect, the hydrolytic stability of the polycarbonate composition is determined as the percent retention of the molecular weight of the polycarbonate polymer composition; wherein the percent retention of molecular weight is at least 85%; and wherein the hydrolytic stability is determined in a hydrolytic aging chamber for 1000 hours at temperature of about 80° C. with a relative humidity of about 70%. In an even further aspect, the hydrolytic stability of the polycarbonate composition is determined as the percent retention of the molecular weight of the polycarbonate polymer composition; wherein the percent retention of molecular weight is at least 88%; and wherein the hydrolytic stability is determined in a hydrolytic aging chamber for 1000 hours at temperature of about 80° C. with a relative humidity of about 70%.

In various aspects, the present invention pertains to blended polycarbonate composition with improved hydrolytic stability comprising:
  a. a hydrolytic stabilizer composition comprising:
    i. from about 0.1 pph to about 1 pph of a hydrotalcite; and
    ii. from about 0.1 pph to about 1 pph of a phosphate buffer solution;
      wherein the phosphate buffer solution has a concentration of about 0.25 M to about 1.0 M; and wherein the phosphate buffer solution has a pH of about 5.0 to about 7.0;
  b. from about 20 pph to about 90 pph of a polycarbonate polymer;
  c. from about 5 pph to about 50 pph of at least one impact modifier; and
  d. pph balance of one or more polymer composition additive selected from colorants, anti-oxidants, mold release agents, lubricants, flame retardant agents, smoke suppressor agents, anti-drip agents, and any mixture thereof;
wherein the composition exhibits an improved hydrolytic stability compared to a reference composition consisting essentially of substantially the same proportions of the same polycarbonate polymer composition and the same acrylonitrile-butadiene-styrene (ABS) polymer composition, in the absence of the same hydrotalcite and the same inorganic salt buffer solution; and wherein the hydrolytic stability is determined as the percent retention of the molecular weight of the polycarbonate polymer composition; wherein the percent retention of molecular weight is at least 80%; and wherein the hydrolytic stability is determined in a hydrolytic aging chamber for 1000 hours at temperature of about 80° C. with a relative humidity of about 70%.

In various aspects, the present invention pertains to a blended polycarbonate composition with improved hydrolytic stability comprising:
  a. a hydrolytic stabilizer composition comprising:
    i. from about 0.1 pph to about 1 pph of a hydrotalcite; and
    ii. from about 0.1 pph to about 1 pph of a phosphate buffer solution;
      wherein the phosphate buffer solution has a concentration of about 0.25 M to about 1.0 M; and wherein the phosphate buffer solution has a pH of about 5.0 to about 7.0;
  b. from about 20 pph to about 90 pph of a polycarbonate polymer;
  c. from about 5 pph to about 50 pph of an ABS polymer composition;
  d. from greater than about 0 pph to about 50 pph of SAN copolymer; and
  e. pph balance of one or more polymer composition additive selected from colorants, anti-oxidants, mold release agents, lubricants, flame retardant agents, smoke suppressor agents, anti-drip agents, and any mixture thereof;
wherein the composition exhibits an improved hydrolytic stability compared to a reference composition consisting essentially of substantially the same proportions of the same polycarbonate polymer composition and the same acrylonitrile-butadiene-styrene (ABS) polymer composition, in the absence of the same hydrotalcite and the same inorganic salt buffer solution; and wherein the hydrolytic stability is determined as the percent retention of the molecular weight of the polycarbonate polymer composition; wherein the percent retention of molecular weight is at least 80%; and wherein the hydrolytic stability is determined in a hydrolytic aging chamber for 1000 hours at temperature of about 80° C. with a relative humidity of about 70%.

In various aspects, the present invention pertains to a blended polycarbonate composition with improved hydrolytic stability comprising:
  a. a hydrolytic stabilizer composition comprising:
    i. from about 0.1 pph to about 1 pph of a hydrotalcite; and
    ii. from about 0.1 pph to about 1 pph of a phosphate buffer solution;

wherein the phosphate buffer solution has a concentration of about 0.25 M to about 1.0 M; and wherein the phosphate buffer solution has a pH of about 5.0 to about 7.0;
b. from about 20 pph to about 90 pph of a polycarbonate polymer;
c. a first impact modifier and a second impact modifier;
wherein the first impact modifier is an ABS polymer composition, and is present in an amount from about 30 pph to about 50 pph; and
wherein the second impact modifier is selected from an ABS polymer composition and a MBS polymer composition, and is present in an amount from about 1 pph to about 10 pph;
d. from greater than about 0 pph to about 50 pph of SAN copolymer; and
e. pph balance of one or more polymer composition additive selected from colorant, anti-oxidants, mold release agents, lubricants, flame retardant agents, smoke suppressor agents, anti-drip agents, and any mixture thereof;

wherein the composition exhibits an improved hydrolytic stability compared to a reference composition consisting essentially of substantially the same proportions of the same polycarbonate polymer composition and the same acrylonitrile-butadiene-styrene (ABS) polymer composition, in the absence of the same hydrotalcite and the same inorganic salt buffer solution; and wherein the hydrolytic stability is determined as the percent retention of the molecular weight of the polycarbonate polymer composition; wherein the percent retention of molecular weight is at least 80%; and wherein the hydrolytic stability is determined in a hydrolytic aging chamber for 1000 hours at temperature of about 80° C. with a relative humidity of about 70%.

In various aspects, the present invention pertains to a blended polycarbonate composition with improved hydrolytic stability comprising:
a. a hydrolytic stabilizer composition comprising:
   i. from about 0.1 pph to about 1 pph of a hydrotalcite; and
   ii. from about 0.1 pph to about 1 pph of a phosphate buffer solution;
      wherein the phosphate buffer solution has a concentration of about 0.25 M to about 1.0 M;
      wherein the phosphate buffer solution has a pH of about 5.0 to about 7.0; and
      wherein the phosphate buffer solution comprises $NaH_2PO_4$ and $Na_2HPO_4$;
b. from about 20 pph to about 90 pph of a polycarbonate polymer;
c. from about 5 pph to about 50 pph of an ABS polymer composition;
   wherein the ABS polymer composition has a butadiene content from about 20% to about 75%;
d. from greater than about 0 pph to about 50 pph of SAN copolymer;
e. from about 0.001 to about 0.5 pph of an antioxidant;
f. from about 0.001 to about 5.0 pph of a colorant; and
g. pph balance of one or more polymer composition additive selected from mold release agents, lubricant, flame retardant agents, smoke suppressor agents, anti-drip agents, and any mixture thereof;

wherein the composition exhibits an improved hydrolytic stability compared to a reference composition consisting essentially of substantially the same proportions of the same polycarbonate polymer composition and the same acrylonitrile-butadiene-styrene (ABS) polymer composition, in the absence of the same hydrotalcite and the same inorganic salt buffer solution; and wherein the hydrolytic stability is determined as the percent retention of the molecular weight of the polycarbonate polymer composition; wherein the percent retention of molecular weight is at least 85%; and wherein the hydrolytic stability is determined in a hydrolytic aging chamber for 1000 hours at temperature of about 80° C. with a relative humidity of about 70%.

In various aspects, the present invention pertains to a blended polycarbonate composition with improved hydrolytic stability comprising:
a. a hydrolytic stabilizer composition comprising:
   i. from about 0.1 pph to about 1 pph of a hydrotalcite; and
   ii. from about 0.1 pph to about 1 pph of a phosphate buffer solution;
      wherein the phosphate buffer solution has a concentration of about 0.25 M to about 1.0 M;
      wherein the phosphate buffer solution has a pH of about 5.0 to about 7.0; and
      wherein the phosphate buffer solution comprises $NaH_2PO_4$ and $Na_2HPO_4$;
b. from about 20 pph to about 90 pph of a polycarbonate polymer;
c. a first impact modifier and a second impact modifier;
   wherein the first impact modifier is an ABS polymer composition, and is present in an amount from about 30 pph to about 50 pph;
   wherein the first impact modifier has a butadiene content from about 20% to about 75%;
   wherein the second impact modifier is selected from an ABS polymer composition and a MBS polymer composition, and
   wherein the second impact modifier is present in an amount from about 1 pph to about 10 pph;
d. from greater than about 0 pph to about 50 pph of SAN copolymer;
e. from about 0.001 to about 0.5 pph of an antioxidant;
f. from about 0.001 to about 5.0 pph of a colorant; and
g. pph balance of one or more polymer composition additive selected from mold release agents, lubricants, flame retardant agents, smoke suppressor agents, anti-drip agents, and any mixture thereof;

wherein the composition exhibits an improved hydrolytic stability compared to a reference composition consisting essentially of substantially the same proportions of the same polycarbonate polymer composition and the same acrylonitrile-butadiene-styrene (ABS) polymer composition, in the absence of the same hydrotalcite and the same inorganic salt buffer solution; and wherein the hydrolytic stability is determined as the percent retention of the molecular weight of the polycarbonate polymer composition; wherein the percent retention of molecular weight is at least 85%; and wherein the hydrolytic stability is determined in a hydrolytic aging chamber for 1000 hours at temperature of about 80° C. with a relative humidity of about 70%.

In various aspects, the present invention pertains to a blended polycarbonate composition with improved hydrolytic stability comprising:
a. a hydrolytic stabilizer composition comprising:
   i. from about 0.1 pph to about 1 pph of a hydrotalcite; and
   ii. from about 0.1 pph to about 1 pph of an inorganic buffer salt;
b. from about 45 pph to about 80 pph of a polycarbonate polymer;
c. a first impact modifier and a second impact modifier;

wherein the first impact modifier is an ABS polymer composition, and is present in an amount from about 30 pph to about 50 pph;
wherein the first impact modifier has a butadiene content from about 20% to about 75%;
wherein the second impact modifier is selected from an ABS polymer composition and a MBS polymer composition, and
wherein the second impact modifier is present in an amount from about 1 pph to about 10 pph;
d. from greater than about 0 pph to about 50 pph of SAN copolymer; and
e. pph balance of one or more polymer composition additive selected from a primary heat stabilizer, a secondary heat stabilizer, and a mold release agent;

wherein the composition exhibits hydrolytic stability with at least about 25% greater weight average molecular weight retention than that of a reference composition consisting essentially of substantially the same proportions of the same polycarbonate polymer composition and the same acrylonitrile-butadiene-styrene (ABS) polymer composition, in the absence of the same hydrotalcite and the same inorganic salt buffer solution. In a further aspect, the composition further comprises one or more polymer composition additive selected from an anti-oxidant, a colorant, a smoke suppressor, an anti-drip agent, and a flame retardant.

In various aspects, the present invention pertains to a blended polycarbonate composition with improved hydrolytic stability comprising:
a. a hydrolytic stabilizer composition comprising:
i. from about 0.1 pph to about 1 pph of a hydrotalcite; and
ii. from about 0.1 pph to about 1 pph of an inorganic buffer salt;
b. from about 45 pph to about 70 pph of a polycarbonate polymer;
c. a first impact modifier and a second impact modifier;
wherein the first impact modifier is an ABS polymer composition, and is present in an amount from about 30 pph to about 50 pph;
wherein the first impact modifier has a butadiene content from about 20% to about 75%;
wherein the second impact modifier is selected from an ABS polymer composition and a MBS polymer composition, and
wherein the second impact modifier is present in an amount from about 1 pph to about 10 pph;
d. from greater than about 0 pph to about 50 pph of SAN copolymer; and
e. pph balance of one or more polymer composition additive selected from a primary heat stabilizer, a secondary heat stabilizer, and a mold release agent;

wherein the composition exhibits hydrolytic stability with at least about 25% greater weight average molecular weight retention than that of a reference composition consisting essentially of substantially the same proportions of the same polycarbonate polymer composition and the same acrylonitrile-butadiene-styrene (ABS) polymer composition, in the absence of the same hydrotalcite and the same inorganic salt buffer solution. In a further aspect, the composition further comprises one or more polymer composition additive selected from an anti-oxidant, a colorant, a smoke suppressor, an anti-drip agent, and a flame retardant.

In various aspects, the present invention pertains to a blended polycarbonate composition with improved hydrolytic stability comprising:
a. a hydrolytic stabilizer composition comprising:
i. from about 0.1 pph to about 1 pph of a hydrotalcite; and
ii. from about 0.1 pph to about 1 pph of an inorganic buffer salt;
b. from about 45 pph to about 55 pph of a polycarbonate polymer;
c. a first impact modifier and a second impact modifier;
wherein the first impact modifier is an ABS polymer composition, and is present in an amount from about 45 pph to about 55 pph;
wherein the first impact modifier has a butadiene content from about 20% to about 75%;
wherein the second impact modifier is selected from an ABS polymer composition and a MBS polymer composition, and
wherein the second impact modifier is present in an amount from about 1 pph to about 10 pph;
d. from greater than about 0 pph to about 50 pph of SAN copolymer; and
e. pph balance of one or more polymer composition additive selected from a primary heat stabilizer, a secondary heat stabilizer, and a mold release agent;

wherein the composition exhibits hydrolytic stability with at least about 25% greater weight average molecular weight retention than that of a reference composition consisting essentially of substantially the same proportions of the same polycarbonate polymer composition and the same acrylonitrile-butadiene-styrene (ABS) polymer composition, in the absence of the same hydrotalcite and the same inorganic salt buffer solution. In a further aspect, the composition further comprises one or more polymer composition additive selected from an anti-oxidant, a colorant, a smoke suppressor, an anti-drip agent, and a flame retardant.

In various aspects, the present invention pertains to a process to improve the hydrolytic stability of blended polycarbonate compositions comprising the addition of an effective amount of a hydrolytic stabilizer, wherein the hydrolytic stabilizer comprises at least one hydrotalcite and at least one inorganic buffer, to increase the hydrolytic stability by at least about 25% greater weight average molecular weight retention than that of a reference composition consisting essentially of substantially the same proportions of the same polycarbonate polymer composition and the same acrylonitrile-butadiene-styrene (ABS) polymer composition, in the absence of the same hydrotalcite and the same inorganic salt.

In various aspects, the present invention pertains an article comprising a disclosed composition. In a still further aspect, the article is used in automotive applications. In an even further aspect, the article is selected from instrument panels, overhead consoles, interior trim, center consoles, panels, quarter panels, rocker panels, trim, fenders, doors, deck lids, trunk lids, hoods, bonnets, roofs, bumpers, fascia, grilles, minor housings, pillar appliqués, cladding, body side moldings, wheel covers, hubcaps, door handles, spoilers, window frames, headlamp bezels, headlamps, tail lamps, tail lamp housings, tail lamp bezels, license plate enclosures, roof racks, and running boards. In a yet further aspect, article is selected from seats, seat backs, cargo floors, door panels, steering wheels, radio speaker grilles, instrument panel bezels, steering columns, drip rails, energy absorbers, kick panels, minor housings, grille opening reinforcements, steps, hatch covers, knobs, buttons, and levers. In an even further aspect, article is selected from instrument panels, overhead consoles, interior trim, center consoles, panels, quarter panels, rocker panels, trim, fenders, doors, deck lids, trunk lids, hoods, bonnets, roofs, bumpers, fascia, grilles, minor housings, pillar appliqués, cladding, body side moldings, wheel covers, hubcaps, door handles, spoilers, window frames, headlamp bezels, headlamps, tail lamps, tail lamp housings, tail lamp bezels, license plate enclosures, roof racks, running boards, seats, seat backs, cargo floors, door panels, steering wheels, radio speaker grilles, instrument panel bezels, steering columns, drip rails, energy absorbers, kick panels, minor housings, grille opening reinforcements, steps, hatch covers, knobs, buttons, and levers.

Polycarbonate Polymer Compositions

In one aspect, the disclosed blended polycarbonate compositions with improved hydrolytic stability of the present invention comprise a polycarbonate polymer composition. In various aspects, the polymeric blended composition can have useful mechanical properties such as impact strength, tensile strength, tensile modulus, and ductility. In other aspects, the polycarbonate polymer compositions can optionally have low background color, good UV stability, and good molecular weight (Mw) stability. It is contemplated herein that the blended polycarbonate compositions with improved hydrolytic stability comprise a polycarbonate polymer composition.

As used herein, the term "polycarbonate" includes homopolycarbonates and copolycarbonates have repeating structural carbonate units. In one aspect, a polycarbonate can comprise any polycarbonate material or mixture of materials, for example, as recited in U.S. Pat. No. 7,786,246, which is hereby incorporated in its entirety for the specific purpose of disclosing various polycarbonate compositions and methods.

In one aspect, a polycarbonate, as disclosed herein, can be an aliphatic-diol based polycarbonate. In another aspect, a polycarbonate can comprise a carbonate unit derived from a dihydroxy compound, such as for example a bisphenol that differs from the aliphatic diol.

In one aspect, non-limiting examples of suitable bisphenol compounds include the following: 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis(hydroxyphenyl)cyclopentane, 1,1-bis(4-hydroxyphenyl)cyclohexane, 1,1-bis(4-hydroxy-3methylphenyl)cyclohexane 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantine, (alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl) sulfide, bis(4-hydroxyphenyl)sulfoxide, bis(4-hydroxyphenyl)sulfone, 9,9-bis(4-hydroxyphenyl)fluorene, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, and the like, as well as combinations comprising at least one of the foregoing dihydroxy aromatic compounds.

In another aspect, exemplary bisphenol compounds can comprise 1,1-bis(4-hydroxyphenyl)methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxy-t-butylphenyl)propane, 3,3-bis(4-hydroxyphenyl)phthalimidine, 2-phenyl-3,3-bis(4-hydroxyphenyl)phthalimidine ("PPPBP"), and 9,9-bis(4-hydroxyphenyl)fluorene. Combinations comprising at least one dihydroxy aromatic compound can also be used. In another aspect, other types of diols can be present in the polycarbonate.

In yet another aspect, polycarbonates with branching groups can be useful, provided that such branching does not significantly adversely affect desired properties of the polycarbonate. Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bisphenol, tris-phenol TC (1,3,5-tris((p-hydroxyphenyl)isopropyl)benzene), tris-phenol PA (4-(4'-(1,1-bis(p-hydroxyphenyl)-ethyl) alpha, alpha-dimethylbenzyl) phenol), 4-chloroformyl phthalic anhydride, trimesic acid, and benzophenone tetracarboxylic acid. In one aspect, a branching agent can be added at a level of about 0.05 to about 2.0 wt %. In still another aspect, mixtures comprising linear polycarbonates and branched polycarbonates can be used.

Polycarbonates, including isosorbide-based polyester-polycarbonate, can comprise copolymers comprising carbonate units and other types of polymer units, including ester units, and combinations comprising at least one of homopolycarbonates and copolycarbonates. An exemplary polycarbonate copolymer of this type is a polyester carbonate, also known as a polyester-polycarbonate. Such copolymers further contain carbonate units derived from oligomeric ester-containing dihydroxy compounds (also referred to herein as hydroxy end-capped oligomeric acrylate esters).

In one aspect, polycarbonates can be manufactured using an interfacial phase transfer process or melt polymerization. Although the reaction conditions for interfacial polymerization can vary, an exemplary process generally involves dissolving or dispersing a dihydric phenol reactant in aqueous caustic soda or potash, adding the resulting mixture to a water-immiscible solvent medium such as for example methylene chloride, and contacting the reactants with a carbonate precursor (such as phosgene) in the presence of a catalyst such as, for example, triethylamine or a phase transfer catalyst salt, under controlled pH conditions of, for example, from about 8 to about 10.

The polycarbonate compounds and polymers disclosed herein can, in various aspects, be prepared by a melt polymerization process. Generally, in the melt polymerization process, polycarbonates are prepared by co-reacting, in a molten state, the dihydroxy reactant(s) (i.e., isosorbide, aliphatic diol and/or aliphatic diacid, and any additional dihydroxy compound) and a diaryl carbonate ester, such as diphenyl carbonate, or more specifically in an aspect, an activated carbonate such as bis(methyl salicyl)carbonate, in the presence of a transesterification catalyst. The reaction can be carried out in typical polymerization equipment, such as one or more continuously stirred reactors (CSTRs), plug flow reactors, wire wetting fall polymerizers, free fall polymerizers, wiped film polymerizers, BANBURY® mixers, single or twin screw extruders, or combinations of the foregoing. In one aspect, volatile monohydric phenol can be removed from the molten reactants by distillation and the polymer is isolated as a molten residue.

The melt polymerization can include a transesterification catalyst comprising a first catalyst, also referred to herein as an alpha catalyst, comprising a metal cation and an anion. In an aspect, the cation is an alkali or alkaline earth metal comprising Li, Na, K, Cs, Rb, Mg, Ca, Ba, Sr, or a combination comprising at least one of the foregoing. The anion is hydroxide ($OH^-$), superoxide ($O^{2-}$), thiolate ($HS^-$), sulfide ($S^{2-}$), a $C_{1-20}$ alkoxide, a $C_{6-20}$ aryloxide, a $C_{1-20}$ carboxylate, a phosphate including biphosphate, a $C_{1-20}$ phosphonate, a sulfate including bisulfate, sulfites including bisulfites and metabisulfites, a $C_{1-20}$ sulfonate, a carbonate including bicarbonate, or a combination comprising at least one of the foregoing. In another aspect, salts of an organic acid comprising both alkaline earth metal ions and alkali metal ions can also be used. Salts of organic acids useful as catalysts are illustrated by alkali metal and alkaline earth metal salts of formic acid, acetic acid, stearic acid and ethyelenediaminetetraacetic acid. The catalyst can also comprise the salt of a non-volatile inorganic acid. By "nonvolatile", it is meant that the referenced compounds have no appreciable vapor pressure at ambient temperature and pressure. In particular, these compounds are not volatile at temperatures at which melt polymerizations of polycarbonate are typically conducted. The salts of nonvolatile acids are alkali metal salts of phosphites; alkaline earth metal salts of phosphites; alkali metal salts of phosphates; and alkaline earth metal salts of phosphates. Exemplary transesterification catalysts include, lithium hydroxide, sodium hydroxide, potassium hydroxide, cesium hydroxide, magnesium hydroxide, calcium hydroxide, barium hydroxide, lithium formate, sodium formate, potassium formate, cesium formate, lithium acetate, sodium acetate, potassium acetate, lithium carbonate, sodium carbonate, potassium carbonate, lithium methoxide, sodium methoxide, potassium methoxide, lithium ethoxide, sodium ethoxide, potassium ethoxide, lithium phenoxide, sodium phenoxide, potassium phenoxide, sodium sulfate, potassium sulfate, $NaH_2PO_3$, $NaH_2PO_4$, $Na_2H_2PO_3$, $KH_2PO_4$, $CsH_2PO_4$, $Cs_2H_2PO_4$, $Na_2SO_3$, $Na_2S_2O_5$, sodium mesylate, potassium mesylate, sodium tosylate, potassium tosylate, magnesium disodium ethylenediaminetetraacetate (EDTA magnesium disodium salt), or a combination comprising at least one of the foregoing. It will be understood that the foregoing list is exemplary and should not be considered as limited thereto. In one aspect, the transesterification catalyst is an alpha catalyst comprising an alkali or alkaline earth salt. In an exemplary aspect, the transesterification catalyst comprising sodium hydroxide, potassium hydroxide, sodium carbonate, potassium carbonate, sodium methoxide, potassium methoxide, $NaH_2PO_4$, or a combination comprising at least one of the foregoing.

The amount of alpha catalyst can vary widely according to the conditions of the melt polymerization, and can be about 0.001 to about 500 μmol. In an aspect, the amount of alpha catalyst can be about 0.01 to about 20 μmol, specifically about 0.1 to about 10 μmol, more specifically about 0.5 to about 9 μmol, and still more specifically about 1 to about 7 μmol, per mole of aliphatic diol and any other dihydroxy compound present in the melt polymerization.

In another aspect, a second transesterification catalyst, also referred to herein as a beta catalyst, can optionally be included in the melt polymerization process, provided that the inclusion of such a second transesterification catalyst does not significantly adversely affect the desirable properties of the polycarbonate. Exemplary transesterification catalysts can further include a combination of a phase transfer catalyst of formula $(R^3)_4Q^+X$ above, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Exemplary phase transfer catalyst salts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is $Cl^-$, $Br^-$, a $C_{1-8}$ alkoxy group or a $C_{6-18}$ aryloxy group. Examples of such transesterification catalysts include tetrabutylammonium hydroxide, methyltributylammonium hydroxide, tetrabutylammonium acetate, tetrabutylphosphonium hydroxide, tetrabutylphosphonium acetate, tetrabutylphosphonium phenolate, or a combination comprising at least one of the foregoing. Other melt transesterification catalysts include alkaline earth metal salts or alkali metal salts. In various aspects, where a beta catalyst is desired, the beta catalyst can be present in a molar ratio, relative to the alpha catalyst, of less than or equal to 10, specifically less than or equal to 5, more specifically less than or equal to 1, and still more specifically less than or equal to 0.5. In other aspects, the melt polymerization reaction disclosed herein uses only an alpha catalyst as described hereinabove, and is substantially free of any beta catalyst. As defined herein, "substantially free of" can mean where the beta catalyst has been excluded from the melt polymerization reaction. In one aspect, the beta catalyst is present in an amount of less than about 10 ppm, specifically less than 1 ppm, more specifically less than about 0.1 ppm, more specifically less than or equal to about 0.01 ppm, and more specifically less than or equal to about 0.001 ppm, based on the total weight of all components used in the melt polymerization reaction.

In one aspect, an end-capping agent (also referred to as a chain-stopper) can optionally be used to limit molecular weight growth rate, and so control molecular weight in the polycarbonate. Exemplary chain-stoppers include certain monophenolic compounds (i.e., phenyl compounds having a single free hydroxy group), monocarboxylic acid chlorides, and/or monochloroformates. Phenolic chain-stoppers are exemplified by phenol and $C_1$-$C_{22}$ alkyl-substituted phenols such as p-cumyl-phenol, resorcinol monobenzoate, and p- and tertiary-butyl phenol, cresol, and monoethers of diphenols, such as p-methoxyphenol. Alkyl-substituted phenols with branched chain alkyl substituents having 8 to 9 carbon atoms can be specifically mentioned.

In another aspect, endgroups can be derived from the carbonyl source (i.e., the diaryl carbonate), from selection of monomer ratios, incomplete polymerization, chain scission, and the like, as well as any added end-capping groups, and can include derivatizable functional groups such as hydroxy groups, carboxylic acid groups, or the like. In one aspect, the endgroup of a polycarbonate, including an polycarbonate polymer as defined herein, can comprise a structural unit derived from a diaryl carbonate, where the structural unit can be an endgroup. In a further aspect, the endgroup is derived from an activated carbonate. Such endgroups can be derived from the transesterification reaction of the alkyl ester of an appropriately substituted activated carbonate, with a hydroxy group at the end of a polycarbonate polymer chain, under conditions in which the hydroxy group reacts with the ester carbonyl from the activated carbonate, instead of with the carbonate carbonyl of the activated carbonate. In this way, structural units derived from ester containing compounds or substructures derived from the activated carbonate and present in the melt polymerization reaction can form ester endgroups.

In one aspect, the melt polymerization reaction can be conducted by subjecting the reaction mixture to a series of temperature-pressure-time protocols. In some aspects, this involves gradually raising the reaction temperature in stages while gradually lowering the pressure in stages. In one aspect, the pressure is reduced from about atmospheric pressure at the start of the reaction to about 1 millibar (100 Pa) or lower, or in another aspect to 0.1 millibar (10 Pa) or lower in several steps as the reaction approaches completion. The temperature can be varied in a stepwise fashion beginning at a temperature of about the melting temperature of the reaction mixture and subsequently increased to final temperature. In one aspect, the reaction mixture is heated from room temperature to about 150° C. In such an aspect, the polymerization reaction starts at a temperature of about 150° C. to about 220° C. In another aspect, the polymerization temperature can be up to about 220° C. In other aspects, the polymerization reaction can then be increased to about 250° C. and then optionally further increased to a temperature of about 320° C., and all subranges there between. In one aspect, the total reaction time can be from about 30 minutes to about 200 minutes and all subranges there between. This procedure will generally ensure that the reactants react to give polycarbonates with the desired molecular weight, glass transition temperature and physical properties. The reaction proceeds to build the polycarbonate chain with production of ester-substituted alcohol by-product such as methyl salicylate. In one aspect, efficient removal of the by-product can be achieved by different techniques such as reducing the pressure. Generally the pressure starts relatively high in the beginning of the reaction and is lowered progressively throughout the reaction and temperature is raised throughout the reaction.

In one aspect, the progress of the reaction can be monitored by measuring the melt viscosity or the weight average molecular weight of the reaction mixture using techniques known in the art such as gel permeation chromatography. These properties can be measured by taking discrete samples or can be measured on-line. After the desired melt viscosity and/or molecular weight is reached, the final polycarbonate product can be isolated from the reactor in a solid or molten form. It will be appreciated by a person skilled in the art, that the method of making aliphatic homopolycarbonate and aliphatic-aromatic copolycarbonates as described in the preceding sections can be made in a batch or a continuous process and the process disclosed herein is preferably carried out in a solvent free mode. Reactors chosen should ideally be self-cleaning and should minimize any "hot spots." However, vented extruders similar to those that are commercially available can be used.

In addition to the polycarbonate, the thermoplastic composition can include various additives ordinarily incorporated in resin compositions of this type, with the proviso that the additives are selected so as to not significantly adversely affect the desired properties of the thermoplastic composition. Combinations of additives can be used. Such additives can be mixed at a suitable time during the mixing of the components for forming the composition.

In other aspects, a polycarbonate composition can comprise one or more of an antioxidant, for instance, phosphorous containing stabilizers and hindered phenols, flame retardant, heat stabilizer, light stabilizer, UV absorbing additive, plasticizer, lubricant, mold release agent, antistatic agent, colorant (e.g., pigment and/or dye), or a combination thereof.

The compositions of the present invention can be blended with the aforementioned ingredients by a variety of methods involving intimate admixing of the materials with any additional additives desired in the formulation. Because of the availability of melt blending equipment in commercial polymer processing facilities, melt processing methods are generally preferred. Illustrative examples of equipment used in such melt processing methods include: co-rotating and counter-rotating extruders, single screw extruders, co-kneaders, disc-pack processors and various other types of extrusion equipment. The temperature of the melt in the present process is preferably minimized in order to avoid excessive degradation of the resins. It is often desirable to maintain the melt temperature between about 230° C. and about 350° C. in the molten resin composition, although higher temperatures can be used provided that the residence time of the resin in the processing equipment is kept short. In some embodiments the melt processed composition exits processing equipment such as an extruder through small exit holes in a die. The resulting strands of molten resin are cooled by passing the strands through a water bath. The cooled strands can be chopped into small pellets for packaging and further handling.

Thermoplastic compositions comprising blended polycarbonate compositions can be manufactured by various methods. For example, powdered polycarbonate, other polymer (if present), and/or other optional components are first blended, optionally with fillers in a HENSCHEL-Mixer® high speed mixer. Other low shear processes, including but not limited to hand mixing, can also accomplish this blending. The blend is then fed into the throat of a twin-screw extruder via a hopper. Alternatively, at least one of the components can be incorporated into the composition by feeding directly into the extruder at the throat and/or downstream through a side-stuffer. Additives can also be compounded into a masterbatch with a desired polymeric resin and fed into the extruder. The extruder is generally operated at a temperature higher than that necessary to cause the composition to flow. The extrudate is immediately quenched in a water batch and pelletized. The pellets, so prepared, when cutting the extrudate can be one-fourth inch long or less as desired. Such pellets can be used for subsequent molding, shaping, or forming.

Impact Modifier

In one aspect, the disclosed blended polycarbonate compositions with improved hydrolytic stability of the present invention comprise one or more impact modifying agents, or impact modifiers. In one aspect, suitable impact modifiers are can be high molecular weight elastomeric materials derived from olefins, monovinyl aromatic monomers, acrylic and methacrylic acids and their ester derivatives, as well as conjugated dienes. The polymers formed from conjugated dienes can be fully or partially hydrogenated. The elastomeric materials can be in the form of homopolymers or copolymers, including random, block, radial block, graft, and core-shell copolymers. In another aspect, a combination of any two or more individual impact modifiers can be used. In a yet further aspect, the impact modifier is emulsion polymerized.

An exemplary type of impact modifier is an elastomer-modified graft copolymer comprising an elastomeric (i.e., rubbery) polymer substrate having a $T_g$ less than about 10° C., less than about −10° C., or about −40° C. to −80° C., and a rigid polymeric superstrate grafted to the elastomeric polymer substrate. Materials suitable for use as the elastomeric phase include, for example, conjugated diene rubbers, for example polybutadiene and polyisoprene; copolymers of a conjugated diene with less than about 50 wt % of a copolymerizable monomer, for example a monovinylic compound such as styrene, acrylonitrile, n-butyl acrylate, or ethyl acrylate; olefin rubbers such as ethylene propylene copolymers (EPR) or ethylene-propylene-diene monomer rubbers (EPDM); ethylene-vinyl acetate rubbers; silicone rubbers; elastomeric $C_{1-8}$ alkyl(meth)acrylates; elastomeric copolymers of $C_{1-8}$ alkyl(meth)acrylates with butadiene and/or styrene; or combinations comprising at least one of the foregoing elastomers. Materials suitable for use as the rigid phase include, for example, monovinyl aromatic monomers such as styrene and alpha-methyl styrene, and monovinylic monomers such as acrylonitrile, acrylic acid, methacrylic acid, and the $C_{1-6}$ esters of acrylic acid and methacrylic acid, specifically poly methyl methacrylate (PMMA) and polystyrene acrylonitrile (SAN).

Exemplary elastomer-modified graft copolymers include those formed from styrene-butadiene-styrene (SBS), styrene-butadiene rubber (SBR), styrene-ethylene-butadiene-styrene (SEBS), ABS (acrylonitrile-butadiene-styrene), acrylonitrile-ethylene-propylene-diene-styrene (AES), styrene-isoprene-styrene (SIS), methyl methacrylate-butadiene-styrene (MBS), methyl methacrylate-butadiene (MB) and styrene-acrylonitrile (SAN).

In one aspect, the inventive polycarbonate composition comprises a styrene-ethylene-butadiene-styrene (SEBS) elastomer. In one aspect, a SEBS impact modifier comprises about 13 wt. % styrene, such as, for example, KRATON® G 1657M, available from Kraton Polymers. In another aspect, a SEBS impact modifier comprises about 33 wt. % styrene, such as, for example, KRATON® G 1651H, available from Kraton Polymers. In yet another aspect, a SEBS impact modifier comprises about 67 wt. % styrene, such as, for example, TUFTEC® H1043, available from Asahi Kasei Chemicals Corporation. In other aspects, other SEBS impact modifiers comprising various amounts of styrene can be used. Such impact modifiers are commercially available, and one of skill in the art, in possession of this disclosure, could readily select an appropriate SEBS impact modifier.

In one aspect, an inventive polycarbonate composition can comprise from about 1 wt. % to 30 wt %, for example, about 1, 2, 4, 6, 8, 10, 12, 14, 16, 18, 20, 22, 24, 26, 28, or 30 wt. %, of an impact modifier, based on the total weight of the polycarbonate, and any additional polymer including impact modifier, in the composition. In another aspect, a polycarbonate composition can comprise from about 1 wt. % to about 25 wt. %, for example, about 1, 3, 5, 7, 9, 11, 13, 15, 17, 19, 21, 23, or 25 wt. %, for example, about 21 wt. % of an impact modifier. In other aspects, the a specific amount of any one or more impact modifiers can vary, based on the remaining components in the system and desired properties of the resulting polymer.

In one aspect, when an impact modifier is blended with a polycarbonate blend, the NII strength can be improved as compared to conventional a polycarbonate blend not containing an impact modifier.

In another aspect, the notched Izod impact ("N11") strength of a polymeric blended composition can be improved by adding an impact modifier that is more brittle rather than more ductile than the composition without the impact modifier. In a further aspect, the disclosed polycarbonate compositions disclosed herein further comprise an impact modifier, such as, for example, an MBS or ABS rubber.

Hydrolytic Stabilizer

In various aspects, the disclosed blended polycarbonate compositions with improved hydrolytic stability of the present invention comprise a hydrolytic stabilizer, wherein the hydrolytic stabilizer comprises a hydrotalcite and an inorganic buffer salt. In a further aspect, the disclosed blended polycarbonate compositions with improved hydrolytic stability of the present invention comprise a hydrolytic stabilizer, wherein the hydrolytic stabilizer comprises one or more hydrotalcites and an inorganic buffer salt comprising one or more inorganic salts capable of pH buffering.

Hydrotalcite is a synthetic or naturally occurring alumino magnesium carbonate. Synthetic hydrotalcite is preferred for its consistency and low color. The effective amount of hydrotalcite needed to improve hydrolytic stability will depend on the amount and type of emulsion polymer blended with PC. In various aspects, the amount of calcined hydrotalcite will be from about 0.1 to 1 pph based on the whole formulation. In some instances the hydrotalcite may be calcined from 400-1000° C. In a further aspect, the calcined hydrotalcite may have a magnesium oxide to aluminum oxide mole ratio of about 1.0 to 5.0. Calcined hydrotalcite with an average particle size of less than or equal to about 10 microns can be used in some cases to improve impact strength. In other instances, for example when food contact is desired, the calcined hydrotalcite has less than about 30 ppm of elements selected from the group consisting of: mercury, lead, cadmium, arsenic, bismuth and mixtures thereof. In a still further aspect, the hydrotalcite has not been coated or treated with a carboxylic acid, carboxylic acid salt, ammonium salt, alkyl ammonium salt, aryl ammonium salt, polyether surfactant or other wetting agent or surfactant. Without wishing to be bound by a particular theory, these wetting agents and surfactants may catalyze polycarbonate decomposition in a manner analogous to the action of some of the residues of emulsion polymerization.

Either synthetic hydrotalcites or natural hydrotalcites can be used as the hydrotalcite compound in the present invention. Exemplary hydrotalcites that are useful in the compositions of the present are commercially available and include, but are not limited to, magnesium hydrotalcites such as DHT-4C (available from Kyowa Chemical Co.); Hysafe 539 and Hysafe 530 (available from J.M. Huber Corporation). Synthetic hydrotalcites can be produced by the reaction of a carbonate source, a magnesium source, and an aluminum source. U.S. Pat. Nos. 3,539,306; 3,650,704 and 4,351,814 disclose the preparation of synthetic hydrotalcites. U.S. Pat. No. 6,291,570 disclosed a flame retardant resin composition that contains hydrotalcite compound particles. These hydrotalcite compounds may be used either individually or in combinations of two or more. An exemplary hydrotalcite useful in the present invention has the following structural formula:

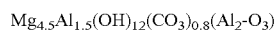

$$Mg_{4.5}Al_{1.5}(OH)_{12}(CO_3)_{0.8}(Al_2-O_3)$$

In a further aspect, the hydrotalcite is a synthetic hydrotalcite. In a yet further aspect, the hydrotalcite is a natural hydrotalcite. In a still further aspect, the hydrotalcite is a calcined hydrotalcite. In a yet further aspect, the hydrotalcite can be in the form of a powder, particulate, granulate, microparticle, or nanoparticle. In a still further aspect, the hydrotalcite is a particulate with median particle size less than about 100 µm, less than about 50 µm, less than about 25 µm, less than about 10 µm, or less than about 1 µm. In a yet further aspect, the hydrotalcite is a particulate with median particle size less than or equal to about 10 µm. In an even further aspect, the hydrotalcite is a particulate with median particle size of about 5 µm.

In various aspects, the inorganic buffer salt is an inorganic salt that can act as a buffering agent. As used herein, the term "inorganic buffer salt" is intended to include inorganic compounds used to resist a change in pH upon dilution or addition of acid or alkali. In a further aspect, the inorganic salt buffer has a pKa value in aqueous solution of about 5.0 to about 7.0 at about 20° C. In a still further aspect, the inorganic salt buffer has a pKa value in aqueous solution of about 6.0 to about 7.0 at about 20° C. In a yet further aspect, the inorganic salt buffer has a pKa value in aqueous solution of about 6.8 at about 20° C. In a still further aspect, the inorganic buffer salt of the present invention comprises an inorganic buffer salt in the solid state and a aqueous inorganic buffer solution. In some instances aqueous buffer solutions are preferred.

In one aspect, the inorganic buffer salt is not an nitrogen or amine-containing salt. In an even further aspect, the inorganic buffer salt is essentially free of a nitrogen-containing species. In a still further aspect, the inorganic buffer salt has about ≤1 ppm nitrogen, about ≤5 ppm nitrogen, or about ≤10 ppm nitrogen. In a yet further aspect, the inorganic buffer salt has about ≤1 ppm nitrogen.

Representative inorganic buffer salts of the present invention include, without limitation, potassium dihydrogen orthophosphate, disodium hydrogen orthophosphate, disodium hydrogen orthophosphate, potassium phosphate, potassium phosphate monobasic, potassium phosphate dibasic, sodium phosphate monobasic, sodium phosphate dibasic, and potassium metaphosphate, and other such like materials known in the art, and combinations thereof. Alternatively, the inorganic buffer salt can by a soluble inorganic salts such as the carbonates, bicarbonates, silicates, pyrophosphates, phosphates, orthoborates, tetraborates, and mixtures thereof. In a still further aspect, the inorganic buffer salt can be an alkali metal salts or alkaline earth metal salts of a dibasic and tribasic inorganic acid, optionally in combination with its conjugate acid salt. Thus, examples of materials which can be used either alone or in combination as a buffering inorganic salt herein include sodium carbonate, sodium bicarbonate, sodium silicate, tetrapotassium pyrophosphate, trisodium phosphate, tripotassium phosphate, anhydrous sodium tetraborate, sodium tetraborate pentahydrate and sodium tetraborate decahydrate. In a still further aspect, ammonium salts, alkali metal salts, and alkaline earth metal salts of a dibasic and tribasic inorganic acid, optionally in combination with its conjugate acid salt. The solid inorganic buffer salt can be anhydrous or a hydrate of the salt. Further examples include carbonate or carbonate-bicarbonate (as their sodium and/or potassium salts), phosphate-monohydrogen phosphate or monohydrogen phosphate-dihydrogen phosphate (as their sodium and/or potassium salts), boric acid-borax, or borax-sodium borate, and the like. In a further aspect, the inorganic buffer salt of the present invention preferably includes one or more sodium phosphate compositions, one or more potassium phosphate compositions or combinations thereof.

In one aspect, the inorganic buffer salt comprises a phosphate buffer salt. An exemplary inorganic buffer salt useful in the present invention is a phosphate buffer salt such as an alkali metal or alkaline earth salt of the dihydrogen phosphate and hydrogen phosphate, e.g. the sodium salts (e.g. $NaH_2PO_4$ and $Na_2HPO_4$) or the potassium salts (e.g. $KH_2PO_4$ and $K_2HPO_4$). In a still further aspect, the inorganic buffer salt is a phosphate buffer salt comprising a combination of the mono ($NaH_2PO_4$) and di-sodium phosphate ($Na_2HPO_4$) solutions.

In various aspects, the inorganic buffer salt is a solid. For example, the blended polycarbonate compositions with improved hydrolytic stability can comprise from about 0.01 pph to about 10 pph of a solid inorganic buffer salt. Alternatively, the blended polycarbonate compositions with improved hydrolytic stability can comprise from about 0.1 to about 1 pph of a solid inorganic buffer salt.

In a further aspect, the solid inorganic buffer salt can be in the form of a powder, particulate, granulate, microparticle, or nanoparticle. In a still further aspect, the inorganic buffer salt is a particulate with median particle size less than about 500 µm, less than about 400 µm, less than about 300 µm, less than about 200 µm, less than about 100 µm, less than about 50 µm, less than about 25 µm, less than about 10 µm, or less than about 1 µm. In a yet further aspect, the inorganic buffer salt is a particulate with median particle size less than or equal to about 10 µm. In an even further aspect, the inorganic buffer salt is a particulate with median particle size of about 5 µm.

In one aspect, the inorganic buffer salt comprises an inorganic salt of a phosphorus-containing oxy-acid. In a further aspect, the phosphorus-containing oxy-acid is a multi-protic phosphorus-containing oxy-acid have the general formula:

$$M_xH_mP_tO_n,$$

where x is 1 or greater, m is 0 or greater, n is 2 or greater, and t is 1 or greater. Examples of inorganic salts of multi-protic phosphorus-containing oxy-acids include, but are not limited to, alkali metal or alkaline earth salts of phosphoric acid, phosphorous acid, hypophosphorous acid, hypophosphoric acid, phosphinic acid, phosphonic acid, metaphosphoric acid, hexametaphosphoric acid, thiophosphoric acid, fluorophosphoric acid, difluorophosphoric acid, fluorophosphorous acid, difluorophosphorous acid, fluorohypophosphorous acid, or fluorohypophosphoric acid.

In one aspect, an aqueous inorganic buffer solution can be prepared from a combination of dibasic or tribasic acid salts and their conjugate acid salts, such as carbonate-bicarbonate, phosphate-monohydrogen phosphate, monohydrogen phosphate-dihydrogen phosphate, etc. Alternatively, an aqueous inorganic buffer solution can be prepared directly from a salt of the dibasic or tribasic acid and a conjugate acid. In various further aspects, an aqueous inorganic buffer solution can be formed in solution by partial neutralization of the salt of the dibasic or tribasic acid with another acid, or such as mineral acids like sulfuric acid, phosphoric acid, or boric acid. Conversely, they may also be formed in situ by partial neutralization of the conjugate acid, such as bicarbonate salt, a monohydrogen phosphate salt, borax, etc., with a strong alkali, such as an alkali metal hydroxide or an alkaline earth metal hydroxide. Variations and adjustments of the pH of the aqueous inorganic buffer solution can be obtained by moderating the addition of the buffer salt(s).

In a further aspect, the aqueous inorganic buffer solution is essentially free of a nitrogen containing species. In a yet further aspect, a nitrogen-containing species is present in an amount less than about 1 ppm nitrogen in the aqueous inorganic buffer solution. In a still further aspect, the aqueous inorganic buffer solution has about ≤1 ppm nitrogen, about ≤5 ppm nitrogen, or about ≤10 ppm nitrogen. In a yet further aspect, the inorganic buffer salt has about ≤1 ppm nitrogen. Nitrogen containing species are for example; ammonia, alkyl amines, aryl amines, ammonium salts, heterocyclic compounds and mixtures thereof. In an even further aspect, the nitrogen-containing species is an ammonium salt. In a still further aspect, the nitrogen-containing species is an amine salt.

In one aspect, the aqueous inorganic buffer solution comprises a phosphate buffer. In a further aspect, the aqueous inorganic buffer solution comprises a phosphorus-containing salt. In a yet further aspect, the phosphorus-containing salt is a phosphate salt. For example, in various aspects, the aqueous inorganic buffer solution is prepare using an inorganic salts of weak inorganic acids. An exemplary inorganic buffer useful in the present invention is phosphate buffer solution prepared from the appropriate salts of the dihydrogen phosphate and hydrogen phosphate, e.g. the sodium salts (e.g. $NaH_2PO_4$ and $Na_2HPO_4$) or the potassium salts (e.g. $KH_2PO_4$ and $K_2HPO_4$). In a still further aspect, the inorganic buffer is a phosphate buffer solution prepared using a combination of the mono ($NaH_2PO_4$) and di-sodium phosphate ($Na_2HPO_4$) solutions. In an even further aspect, the phosphate buffer solution comprises phosphate containing salts of sodium, potassium, lithium, cesium, calcium, magnesium, strontium, barium, zinc, tin, aluminum, or any combination thereof.

In a further aspect, the aqueous inorganic buffer solution used in the blended polycarbonate composition has a concentration selected from about 0.1 M, about 0.2 M, about 0.3, about 0.4 M, about 0.5 M, about 0.6 M, about 0.7 M, about 0.8 M, about 0.9 M, and about 1.0 M. In a still further aspect, the aqueous inorganic buffer solution has a concentration of about 0.5 M. In a yet further aspect, the aqueous inorganic buffer solution has a concentration of about 0.25 M to about 1.0 M. In an even further aspect, the aqueous inorganic buffer solution has a concentration of about 0.25 M to about 0.75 M. In a still further aspect, the aqueous inorganic buffer solution has a concentration of about 0.40 M to about 0.60 M. In a yet further aspect, the aqueous inorganic buffer solution has a concentration of about 0.5 M.

In a further aspect, the phosphate buffer solution used in the blended polycarbonate composition has a concentration selected from about 0.1 M, about 0.2 M, about 0.3, about 0.4 M, about 0.5 M, about 0.6 M, about 0.7 M, about 0.8 M, about 0.9 M, and about 1.0 M. In a still further aspect, the phosphate buffer solution has a concentration of about 0.5 M. In a yet further aspect, the phosphate buffer solution has a concentration of about 0.25 M to about 1.0 M. In an even further aspect, the phosphate buffer solution has a concentration of about 0.25 M to about 0.75 M. In a still further aspect, the phosphate buffer solution has a concentration of about 0.40 M to about 0.60 M. In a yet further aspect, the phosphate buffer solution has a concentration of about 0.5 M.

In a further aspect, the aqueous inorganic buffer solution used in the blended polycarbonate composition has a pH selected from about 6.5, about 6.6, about 6.7, about 6.8, about 6.9, about 7.0, about 7.1, about 7.2, about 7.3, about 7.4, and about 7.5. In a yet further aspect, the aqueous inorganic buffer solution has a pH about ≤7.0. In an even further aspect, the aqueous inorganic buffer solution has a pH of about 5.0 to about 7.0. In a still further aspect, the organic buffer solution has a pH of about 6.0 to about 7.0. In a yet further aspect, the organic buffer solution has a pH of about 6.8.

In a further aspect, the phosphate buffer solution used in the blended polycarbonate composition has a pH selected from about 6.5, about 6.6, about 6.7, about 6.8, about 6.9, about 7.0, about 7.1, about 7.2, about 7.3, about 7.4, and about 7.5. In a yet further aspect, the phosphate buffer solution has a pH about ≤7.0. In an even further aspect, the phosphate buffer solution has a pH of about 5.0 to about 7.0. In a still further aspect, the phosphate buffer solution has a pH of about 6.0 to about 7.0. In a yet further aspect, the phosphate buffer solution has a pH of about 6.8.

In a further aspect, the aqueous inorganic buffer solution used in the blended polycarbonate composition is a sodium phosphate buffer solution with a concentration of about 0.5 and a pH of about 6.8.

The process for improving hydrolytic stability of the blended polycarbonate compositions of the present invention comprises preparing a desired blend of at least polycarbonate polymer, of at least one impact modifier composition, a SAN copolymer, and adding varying amounts, as described in the description herein, of hydrolytic stabilizer composition comprising a hydrotalcite and an inorganic buffer salt, melt mixing the ingredients and testing the resultant mixture, or parts molded from it, for improved retention of properties after exposure to moisture. In this manner the optimal amount of hydrolytic stabilizer composition needed to improve property retention after exposure to moisture, compared to similar blends with no hydrolytic stabilizer composition, is determined. The exposure to moisture can take place in various manners, for various times and at various temperatures. For example; the parts may be autoclaved for several cycles, they may be exposed to steam in a pressure cooker, molded parts may be immersed in water or exposed to constant humidity at various temperatures. A useful method is to expose molded parts to a constant relative humidity of 95% at 90° C. for 500 or 1000 hours. Some methods that may be used to determine retention of properties after exposure to moisture are; retention of melt viscosity, retention of impact strength, such as Izod impact and retention of flexural or tensile strength. These tests are well known to those skilled in the art and can be measured by various standardized procedures such as ASTM and ISO methods.

Additives for Blended Polycarbonate Compositions

The blended polycarbonate compositions of the present invention can also be combined with various additives including, but not limited to, colorants such as titanium dioxide, zinc sulfide and carbon black; stabilizers or antioxidants such as hindered phenols, phosphites, phosphonites, thioesters and mixtures thereof, as well as mold release agents, lubricants, flame retardants, smoke suppressors and anti-drip agents, for example, those based on fluoropolymers.

In other aspects, the inventive polycarbonate can comprise one or more other materials, i.e. polymer additives, which can maintain and/or improve various properties of the resulting material. The additive may include, but are not limited to, fillers, antioxidants, lubricants, flame retardants, nucleating agents, coupling agents, ultraviolet absorbers, ultraviolet stabilizers, pigments, dyes, plasticizers, processing aids, viscosity control agents, tackifiers, anti-blocking agents, surfactants, extender oils, metal deactivators, voltage stabilizers, boosters, catalysts, smoke suppressants and the like, or a combination containing at least one of the foregoing, depending on the final selected characteristics of the compositions. Examples of additives, fillers and the like that may be used in the present invention include, but are not limited to, antioxidants, mineral fillers, and the like, or a combination containing at least one of the foregoing.

In various aspects, the polymer composition additive comprises one or more of a colorant, anti-oxidant, mold release agent, lubricant, flame retardant agent, smoke suppressor agent, and anti-drip agent.

In a further aspect, the blended polycarbonate composition further comprises an antioxidant in an amount from about 0.001 pph to about 0.500 pph. In a yet further aspect, the antioxidant is selected from hindered phenols, phosphites, phosphonites, thioesters and any mixture thereof.

In a further aspect, the blended polycarbonate composition further comprises a colorant in an amount from about 0.001 pph to about 5.000 pph. In a still further aspect, the colorant is selected from the group consisting of carbon black and titanium dioxide. In a yet further aspect, the colorant is carbon black. In an even further aspect, the colorant is titanium dioxide. In a still further aspect, the titanium dioxide is encapsulated with a silica alumino layer which is passivated with a silicon containing compound. The titanium dioxide can be passivated by treatment with silica and/or alumina by any of several methods which are well known in the art including, without limit, silica and/or alumina wet treatments used for treating pigment-sized titanium dioxide.

The compositions of the invention can also be combined with various additives including, but not limited to, colorants such as titanium dioxide, zinc sulfide and carbon black; stabilizers such as hindered phenols, phosphites, phosphonites, thioesters and mixtures thereof, as well as mold release agents, lubricants, flame retardants, smoke suppressors and anti-drip agents, for example, those based on fluoro polymers. Use of phosphonate or phosphite compounds or mixtures thereof may be desired in some instances to improve color and oxidative stability. In another instance triaryl phosphonate, phosphite compounds or mixtures thereof may be employed. Effective amounts of the additives vary widely, but they are usually present in an amount up to about 0.01-20% or more by weight, based on the weight of the entire composition. Flame retardants based on sulfonate salts, such a perfluoro alky metal sulfonates, aryl sulfonate salts or mixtures thereof, aryl phosphates and halogenated aromatic compounds may be useful. Ultraviolet light stabilizers can also be added to the compositions in effective amounts. Preferred mold release agents are alkyl carboxylic acid esters, for example, pentaerythritol tetrastearate, glycerin tristearate and ethylene glycol distearate. Mold release agents are typically present in the composition at 0.01-0.5% by weight of the formulation. Other examples of mold release agents are may also be alpha-olefins or low molecular weight poly alpha olefins, or blends thereof.

Examples of antioxidants include, but are not limited to, hindered phenols such tetrakis[methylene(3,5-di-t-butyl-4-hydroxyhydrocinnamate)]-methane, 4,4'-thiobis(2-methyl-6-tert-butylphenol), and thiodiethylene bis(3,5-di-tert-butyl-4-hydroxy)hydrocinnamate, octadecyl-3(3.5-di-tert.butyl-4-hydroxyphenyl)propionate, pentaerythritol tetrakis(3(3.5-di-tert.butyl-4-hydroxyphenyl)propionate), phosphites and phosphonites such as tris(2,4-di-tert-butylphenyl)phosphite and thio compounds such as dilauryl thiodipropionate, dimyristyl thiodipropionate, and distearyl thiodipropionate, potassium iodide, cuprous iodide, various siloxanes, and amines such as polymerized 2,2,4-trimethyl-1,2-dihydroquinoline and the like, or a combination containing at least one of the foregoing.

Examples of flame retardants include, but are not limited to, halogenated flame retardants, like tetrabromo bisphenol A oligomers such as BC58 and BC52, brominated polystyrene or poly(dibromo-styrene), brominated epoxies, pentabromobenzyl acrylate polymer, ethylene-bis(tetrabromophthalimide, bis(pentabromobenzyl)ethane, $Al(OH)_3$, phosphor based FR systems like red phosphorus, metal phosphinates, expandable graphites, sodium or potassium perfluorobutane sulfate, sodium or potassium perfluorooctane sulfate, sodium or potassium diphenylsulfone sulfonate and sodium- or potassium-2,4,6-trichlorobenzoate, or a combination containing at least one of the foregoing.

In another aspect, the inventive polycarbonate composition can comprise a filler, such as, for example, an inorganic filler or reinforcing agent. The specific composition of a filler, if present, can vary, provided that the filler is chemically compatible with the remaining components of the polycarbonate composition. In one aspect, the polycarbonate composition comprises a filler, such as, for example, talc. If present, the amount of filler can comprise any amount suitable for a polycarbonate composition that does not adversely affect the desired properties thereof. In one aspect, the inventive polycarbonate comprises about 1 wt. % to about 10 wt. % of a filler.

In another aspect, a filler can comprise silicates and silica powders such as aluminum silicate (mullite), synthetic calcium silicate, zirconium silicate, fused silica, crystalline silica graphite, natural silica sand, or the like; boron powders such as boron-nitride powder, boron-silicate powders, or the like; oxides such as $TiO_2$, aluminum oxide, magnesium oxide, or the like; calcium sulfate (as its anhydride, dihydrate or trihydrate), or the like; talc, including fibrous, modular, needle shaped, lamellar talc, or the like; wollastonite; surface-treated wollastonite; glass spheres such as hollow and solid glass spheres, silicate spheres, aluminosilicate, or the like; kaolin, including hard kaolin, soft kaolin, calcined kaolin, kaolin comprising various coatings known in the art to facilitate compatibility with the polymeric matrix resin, or the like; single crystal fibers or "whiskers" such as silicon carbide, alumina, boron carbide, iron, nickel, copper, or the like; fibers (including continuous and chopped fibers), carbon fibers, glass fibers, such as E, A, C, ECR, R, S, D, or NE glasses, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper and nickel or the like; flaked fillers such as glass flakes, flaked silicon carbide, aluminum diboride, aluminum flakes, steel flakes or the like; fibrous fillers, for example short inorganic fibers such as those derived from blends comprising at least one of aluminum silicates, aluminum oxides, magnesium oxides, and calcium sulfate hemihydrate or the like; natural fillers and reinforcements, such as wood flour obtained by pulverizing wood, fibrous products such as cellulose, cotton, or the like; organic fillers such as polytetrafluoroethylene; reinforcing organic fibrous fillers formed from organic polymers capable of forming fibers such as poly(ether ketone), polyimide, polybenzoxazole, poly(phenylene sulfide), aromatic polyamides, aromatic polyimides, polyetherimides, polytetrafluoroethylene, or the like; as well as additional fillers and reinforcing agents such as mica, clay, feldspar, flue dust, fillite, quartz, quartzite, perlite, tripoli, diatomaceous earth, carbon black, or the like, or combinations comprising at least one of the foregoing fillers or reinforcing agents.

In one aspect, a filler, if present, can be coated with a layer of metallic material to facilitate conductivity, or surface treated with silanes to improve adhesion and dispersion with the polymeric matrix resin. In addition, the reinforcing fillers can be provided in the form of monofilament or multifilament fibers and can be used individually or in combination with other types of fiber, through, for example, co-weaving or core/sheath, side-by-side, orange-type or matrix and fibril constructions, or by other methods known to one skilled in the art of fiber manufacture. Exemplary co-woven structures include, for example, glass fiber-carbon fiber, carbon fiber-aromatic polyimide (aramid) fiber, and aromatic polyimide fiberglass fiber or the like. Fibrous fillers can be supplied in the form of, for example, rovings, woven fibrous reinforcements, such as 0-90 degree fabrics or the like; non-woven fibrous reinforcements such as continuous strand mat, chopped strand mat, tissues, papers and felts or the like; or three-dimensional reinforcements such as braids.

Manufacture of Blended Polycarbonate Compositions

In various aspects, the blended polycarbonate compositions of the present invention can be manufactured by various methods. The compositions of the present invention can be blended with the aforementioned ingredients by a variety of methods involving intimate admixing of the materials with any additional additives desired in the formulation. Because of the availability of melt blending equipment in commercial polymer processing facilities, melt processing methods can be used. In various further aspects, the equipment used in such melt processing methods includes, but is not limited to, the following: co-rotating and counter-rotating extruders, single screw extruders, co-kneaders, disc-pack processors and various other types of extrusion equipment. In a further aspect, the extruder is a twin-screw extruder. In various further aspects, the melt processed composition exits processing equipment such as an extruder through small exit holes in a die. The resulting strands of molten resin are cooled by passing the strands through a water bath. The cooled strands can be chopped into small pellets for packaging and further handling.

The temperature of the melt is minimized in order to avoid excessive degradation of the resins. For example, it can be desirable to maintain the melt temperature between about 230° C. and about 350° C. in the molten resin composition, although higher temperatures can be used provided that the residence time of the resin in the processing equipment is kept short. In a still further aspect, the extruder is typically operated at a temperature of about 180° C. to about 385° C. In a yet further aspect, the extruder is typically operated at a temperature of about 200° C. to about 330° C. In an even further aspect, the extruder is typically operated at a temperature of about 220° C. to about 300° C.

In various aspects, the blended polycarbonate compositions of the present invention can be prepared by blending the hydrolytic stabilizer composition, the polycarbonate polymer composition, the impact modifier composition, and the SAN copolymer components in mixer, e.g. a HENSCHEL-Mixer® high speed mixer or other suitable mixer/blender. Other low shear processes, including but not limited to hand mixing, can also accomplish this blending. The mixture can then be fed into the throat of a single or twin screw extruder via a hopper. Alternatively, at least one of the components can be incorporated into the composition by feeding directly into the extruder at the throat and/or downstream through a sidestuffer. Additives can also be compounded into a masterbatch desired polymeric resin and fed into the extruder. The extruder generally operated at a temperature higher than that necessary to cause the composition to flow. The extrudate is immediately quenched in a water bath and pelletized. The pellets, so prepared, when cutting the extrudate can be one-fourth inch long or less as desired. Such pellets can be used for subsequent molding, shaping, or forming.

Articles

In various aspects, the disclosed blended polycarbonate compositions with improved hydrolytic stability of the present invention can be used in making articles. The disclosed blended polycarbonate compositions can be formed into useful shaped articles by a variety of means such as; injection molding, extrusion, rotational molding, compression molding, blow molding, sheet or film extrusion, profile extrusion, gas assist molding, structural foam molding and thermoforming. The blended polycarbonate compositions described herein resins can also be made into film and sheet as well as components of laminate systems. In a further aspect, In an embodiment, a method of manufacturing an article comprises melt blending the hydrolytic stabilizer composition, the polycarbonate polymer composition, the impact modifier composition, and the SAN copolymer components; and molding the extruded composition into an article. In a still further aspect, the extruding is done with a single screw extruder or a twin screw extruder.

Formed articles include, for example, computer and business machine housings, home appliances, trays, plates, handles, helmets, automotive parts such as instrument panels, cup holders, glove boxes, interior coverings and the like. In various further aspects, formed articles include, but are not limited to, food service items, medical devices, animal cages, electrical connectors, enclosures for electrical equipment, electric motor parts, power distribution equipment, communication equipment, computers and the like, including devices that have molded in snap fit connectors. In a further aspect, articles of the present invention comprise exterior body panels and parts for outdoor vehicles and devices including automobiles, protected graphics such as signs, outdoor enclosures such as telecommunication and electrical connection boxes, and construction applications such as roof sections, wall panels and glazing. Multilayer articles made of the disclosed polycarbonates particularly include articles which will be exposed to UV-light, whether natural or artificial, during their lifetimes, and most particularly outdoor articles; i.e., those intended for outdoor use. Suitable articles are exemplified by enclosures, housings, panels, and parts for outdoor vehicles and devices; enclosures for electrical and telecommunication devices; outdoor furniture; aircraft components; boats and marine equipment, including trim, enclosures, and housings; outboard motor housings; depth finder housings, personal water-craft; jet-skis; pools; spas; hot-tubs; steps; step coverings; building and construction applications such as glazing, roofs, windows, floors, decorative window furnishings or treatments; treated glass covers for pictures, paintings, posters, and like display items; wall panels, and doors; protected graphics; outdoor and indoor signs; enclosures, housings, panels, and parts for automatic teller machines (ATM); enclosures, housings, panels, and parts for lawn and garden tractors, lawn mowers, and tools, including lawn and garden tools; window and door trim; sports equipment and toys; enclosures, housings, panels, and parts for snowmobiles; recreational vehicle panels and components; playground equipment; articles made from plastic-wood combinations; golf course markers; utility pit covers; computer housings; desk-top computer housings; portable computer housings; lap-top computer housings; palm-held computer housings; monitor housings; printer housings; keyboards; facsimile machine housings; copier housings; telephone housings; mobile phone housings; radio sender housings; radio receiver housings; light fixtures; lighting appliances; network interface device housings; transformer housings; air conditioner housings; cladding or seating for public transportation; cladding or seating for trains, subways, or buses; meter housings; antenna housings; cladding for satellite dishes; coated helmets and personal protective equipment; coated synthetic or natural textiles; coated photographic film and photographic prints; coated painted articles; coated dyed articles; coated fluorescent articles; coated foam articles; and like applications.

In one aspect, the present invention pertains to articles comprising the disclosed blended polycarbonate compositions. In a further aspect, the article comprising the disclosed blended polycarbonate compositions is used in automotive applications. In a still further aspect, the article used in automotive applications is selected from instrument panels, overhead consoles, interior trim, center consoles, panels, quarter panels, rocker panels, trim, fenders, doors, deck lids, trunk lids, hoods, bonnets, roofs, bumpers, fascia, grilles, minor housings, pillar appliqués, cladding, body side moldings, wheel covers, hubcaps, door handles, spoilers, window frames, headlamp bezels, headlamps, tail lamps, tail lamp housings, tail lamp bezels, license plate enclosures, roof racks, and running boards. In a yet further aspect, the article used in automotive applications is selected from seats, seat backs, cargo floors, door panels, steering wheels, radio speaker grilles, instrument panel bezels, steering columns, drip rails, energy absorbers, kick panels, mirror housings, grille opening reinforcements, steps, hatch covers, knobs, buttons, and levers. In an even further aspect, the article used in automotive applications is selected from seats, seat backs, cargo floors, door panels, steering wheels, radio speaker grilles, instrument panel bezels, steering columns, drip rails, energy absorbers, kick panels, mirror housings, grille opening reinforcements, steps, hatch covers, knobs, buttons, and levers. In an even further aspect, article is selected from instrument panels, overhead consoles, interior trim, center consoles, panels, quarter panels, rocker panels, trim, fenders, doors, deck lids, trunk lids, hoods, bonnets, roofs, bumpers, fascia, grilles, minor housings, pillar appliqués, cladding, body side moldings, wheel covers, hubcaps, door handles, spoilers, window frames, headlamp bezels, headlamps, tail lamps, tail lamp housings, tail lamp bezels, license plate enclosures, roof racks, running boards, seats, seat backs, cargo floors, door panels, steering wheels, radio speaker grilles, instrument panel bezels, steering columns, drip rails, energy absorbers, kick panels, mirror housings, grille opening reinforcements, steps, hatch covers, knobs, buttons, and levers.

Without further elaboration, it is believed that one skilled in the art can, using the description herein, utilize the present invention. The following examples are included to provide addition guidance to those skilled in the art of practicing the claimed invention. The examples provided are merely representative of the work and contribute to the teaching of the present invention. Accordingly, these examples are not intended to limit the invention in any manner.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Throughout this application, various publications are referenced. The disclosures of these publications in their entireties are hereby incorporated by reference into this application in order to more fully describe the state of the art to which this pertains. The references disclosed are also individually and specifically incorporated by reference herein for the material contained in them that is discussed in the sentence in which the reference is relied upon. Nothing herein is to be construed as an admission that the present invention is not entitled to antedate such publication by virtue of prior invention. Further, the dates of publication provided herein may be different from the actual publication dates, which can require independent confirmation.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric. Unless indicated otherwise, percentages referring to composition are in terms of wt %. There are numerous variations and combinations of reaction conditions, e.g., component concentrations, desired solvents, solvent mixtures, temperatures, pressures and other reaction ranges and conditions that can be used to optimize the product purity and yield obtained from the described process. Only reasonable and routine experimentation will be required to optimize such process conditions.

Example 1

The materials shown in Table 1 were used to prepare the compositions described herein. Batches were prepared of the formulations shown in Tables 2 and 3. Sample batches (40 LBS) were prepared by pre-blending all constituents in a dry-blend and tumble mixed for 20 minutes. The pre-blend was fed directly to a co-rotation twin screw extruder (30 mm) operated under standard processing conditions well known to one skilled in the art. Representative examples of the present invention are designated by numbers, comparative (control) examples are designated by letters.

Samples from the batches were subjected to hydrolytic stress by placement in a hydrolytic chamber for 1000 hours at 80° C. and 70% relative humidity ("RH"). Hydrolytic stability was assessed by comparison of the weight average molecular weight ("Mw") of polycarbonate polymer before and after hydrolytic stress as described above. The data were converted to percent retention of the initial Mw and the data are shown in Table 4 (indicated as "% Retention, PC Mw" in the table). Mw was determined by gel permeation chromatography (GPC) as per ASTM method D5296.

Injection molded parts (ISO180 Izod bars, 4 mm thickness) were exposed to heat (70° C.) and humidity (80% relative humidity) in an ESPEC Platinum ESL-3CA chamber for 1000 hours. The polycarbonate molecular weight on aged and control samples were determined using Gel Permeation Chromatography using a Waters Alliance HPLC Model 2695. PC/ABS resin is extracted with acetone to remove SAN. The residue (PC) was then dried under nitrogen purge and then dissolved at 2 mg/ml concentration in methylene chloride for GPC analysis. GPC is performed using 2 Waters Linear Ultra-Styragel (Mixed Bed) columns. Injection volume=50 µl. Methylene chloride was used as the mobile phase at a flow rate=1.0 ml/min. PC Mw was determined from a calibration curve based upon analysis of monodisperse polystyrene standards in the range 214-132,900 Da. A Waters 2487 ultraviolet detector measuring absorbance at 254 nm was used to generate the chromatogram. PC Mw retention data for various exemplary compositions of the present invention are shown in Table 4.

Comparison of Examples A to D (see Table 2 for composition and Table 4 for PC molecular weight retained data) shows that increasing the level of calcined hydrotalcite (DHT-4C) from 0 pph to 0.75 pph resulted in a monotonic increase in the PC Mw retained following hydrolytic exposure as described herein. For example, the change in PC Mw retention was from 58% PC Mw retention for sample A (0 pph added hydrotalcite) to 66% for Example B (0.38 pph calcined hydrotalcite) and 91% PC Mw for Example D (0.75 pph calcined hydrotalcite). In contrast, Examples E and F (see Table 2 for composition and Table 4 for PC molecular weight retained data) did not contain any calcined hydrotalcite (DHT-4C), but have only 0.5 molar sodium phosphate buffer (at pH 6.8) at different levels. Comparison of the PC Mw retention for these samples with Example A shows that the mere addition of the phosphate buffer (P-Buffer) resulted in only 64% PC Mw retention upon exposure to moisture at 80° C. and 70% RH. The control, Example A, with no additive had a 58% PC Mw retention after hydrolytic aging.

The surprising result shown by these exemplary data is that a combination of a hydrotalcite (DHT-4C) with sodium phosphate buffer of pH 6.8 (P-Buffer) in Examples 1, 2 and 3 result in a profound increase in hydrolytic stability as shown by the increase in PC Mw retention. For example, comparison of the PC Pw data (see Table 4) for Example 1 (with 96% PC Mw retention) with Example B (66% PC Mw retention) and sample E (59% PC Mw retention) indicates a synergistic effect on PC Mw retention by combining the two additives, a calcined hydrotalcite (DHT-4C) and a phosphate buffer (P-Buffer). Examples 2 and 3 with higher levels of these two additives (calcined hydrotalcite with buffer) resulted in extremely good PC Mw retention. The observation that Example 1 with lower levels of these two additives (hydrotalcite with phosphate buffer) performed better than samples 2 and 3 suggests that even lower loadings of these two hydrolytic stabilizers is possible.

TABLE 1

| Item | Description | Supplier | Tradename |
| --- | --- | --- | --- |
| PC1 | Polycarbonate homopolymer with a Mw of 21,900 | SABIC-Innovative Plastics | LEXAN* |
| PC2 | Polycarbonate homopolymer with a Mw of 29,900 | SABIC-Innovative Plastics | LEXAN* |
| ABS1 | SAN grafted emulsion ABS with butadiene content ~31% | SABIC-Innovative Plastics | CYCOLAC* |
| ABS2 | SAN grafted emulsion ABS with butadiene content ~61.2% | SABIC-Innovative Plastics | CYCOLAC* |
| MR | Mold Release, pentaerythritol tetrastearate | LONZA Spa | Glycolube P |
| STAB1 | Tris(2,4-di-t-butylphenyl)phosphite | CIBA | Irgafos 168 |
| STAB2 | Pentaerythritol betalauryl thiopropionate | Haruno Sangyo Kaisha | Seenox 412S |
| STAB3 | Octadecyl-3(3,5-ditertbutyl-4-hydroxyphenyl)propionate | CIBA/BASF | Irganox 1076 |
| DHT-4C | Hydrotalcite $Mg_{4.5}Al_{1.5}(OH)_{12}(CO_3)_{0.8}(Al_2-O_3)$ | Kisuma Chemicals | DHT-4C |
| P-Buffer | 0.5 M aqueous sodium phosphate buffer of 6.8 pH | Sigma Aldrich | — |

TABLE 2

| Item | A | B | C | D | E | F |
| --- | --- | --- | --- | --- | --- | --- |
| PC1 | 37.0 | 37.0 | 37.0 | 37.0 | 37.0 | 37.0 |
| PC2 | 16.0 | 16.0 | 16.0 | 16.0 | 16.0 | 16.0 |
| ABS1 | 41.0 | 41.0 | 41.0 | 41.0 | 41.0 | 41.0 |
| ABS2 | 5.0 | 5.0 | 5.0 | 5.0 | 5.0 | 5.0 |
| MR | 0.100 | 0.100 | 0.100 | 0.100 | 0.100 | 0.100 |
| STAB1 | 0.100 | 0.100 | 0.100 | 0.100 | 0.100 | 0.100 |
| STAB2 | 0.200 | 0.200 | 0.200 | 0.200 | 0.200 | 0.200 |
| STAB3 | 0.300 | 0.300 | 0.300 | 0.300 | 0.300 | 0.300 |
| DHT-4C | 0.000 | 0.375 | 0.550 | 0.750 | 0.000 | 0.000 |
| P-Buffer | 0.000 | 0.000 | 0.000 | 0.000 | 0.438 | 0.875 |

TABLE 3

| Item | 1 | 2 | 3 |
| --- | --- | --- | --- |
| PC1 | 37.0 | 37.0 | 37.0 |
| PC2 | 16.0 | 16.0 | 16.0 |
| ABS1 | 41.0 | 41.0 | 41.0 |
| ABS2 | 5.0 | 5.0 | 5.0 |
| MR | 0.10 | 0.10 | 0.10 |
| STAB1 | 0.10 | 0.10 | 0.10 |
| STAB2 | 0.20 | 0.20 | 0.20 |
| STAB3 | 0.30 | 0.30 | 0.30 |
| DHT-4C | 0.375 | 0.750 | 0.750 |
| P-Buffer | 0.438 | 0.875 | 0.875 |

TABLE 4

| SAMPLE | DHT-4C pph | Buffer pph | % Retention (PC Mw) |
| --- | --- | --- | --- |
| A | 0.00 | 0.00 | 58 |
| B | 0.38 | 0.00 | 66 |
| C | 0.55 | 0.00 | 77 |
| D | 0.75 | 0.00 | 91 |
| E | 0.00 | 0.44 | 59 |
| F | 0.00 | 0.88 | 54 |
| 1 | 0.38 | 0.44 | 96 |
| 2 | 0.75 | 0.88 | 90 |
| 3 | 0.75 | 0.88 | 90 |

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A blended polycarbonate composition with improved hydrolytic stability comprising:
   a. a hydrolytic stabilizer composition comprising:
      i. from about 0.1 pph to about 1 pph of a calcined hydrotalcite; and
      ii. from about 0.1 pph to about 1 pph of an inorganic salt buffer solution;
   b. from about 20 pph to about 90 pph of a polycarbonate polymer;
   c. from about 5 pph to about 50 pph of at least one impact modifier; and
   d. pph balance of one or more polymer composition additive;
   wherein the composition exhibits hydrolytic stability with at least about 25% greater weight average molecular weight retention than that of a reference composition consisting essentially of substantially the same proportions of the same polycarbonate polymer composition and the same acrylonitrile-butadiene-styrene (ABS) polymer composition, in the absence of the same calcined hydrotalcite and the same inorganic salt buffer solution.

2. The composition of claim 1, wherein the calcined hydrotalcite is present in amount from about 0.30 pph to about 0.60 pph.

3. The composition of claim 1, wherein the aqueous inorganic buffer solution has a pH from about 5.0 to about 7.0.

4. The composition of claim 1, wherein the aqueous inorganic buffer solution has a concentration of about 0.25 M to about 1.0 M.

5. The composition of claim 1, wherein the aqueous inorganic buffer solution is essentially free of a nitrogen-containing species.

6. The composition of claim 1, wherein the aqueous inorganic buffer solution is a phosphate buffer solution.

7. The composition of claim 6, wherein the phosphate buffer solution comprises phosphate containing salts of sodium, potassium, lithium, cesium, calcium, magnesium, strontium, barium, zinc, tin, aluminum, or any combination thereof.

8. The composition of claim 6, wherein the phosphate buffer solution comprises $NaH_2PO_4$ and $Na_2HPO_4$.

9. The composition of claim 1, wherein the polycarbonate polymer is present in an amount from about 45 pph to about 80 pph.

10. The composition of claim 1, wherein the polycarbonate polymer is present in an amount from about 45 pph to about 70 pph.

11. The composition of claim 1, wherein the polycarbonate polymer is present in an amount from about 45 pph to about 55 pph.

12. The composition of claim 1, wherein impact modifier comprises at least one acrylonitrile-butadiene-styrene (ABS) polymer composition.

13. The composition of claim 12 wherein the butadiene content in the ABS polymer is from about 20% to about 75%.

14. The composition of claim 12, wherein the butadiene content in the ABS polymer is from about 30% to about 65%.

15. The composition of claim 12, wherein the ABS polymer composition further comprises a first ABS polymer composition component and a second ABS polymer composition component.

16. The composition of claim 15, wherein the first ABS polymer composition component is present in an amount from about 30 pph to about 50 pph.

17. The composition of claim 15, wherein the first ABS polymer composition component has a butadiene content from about 30% to about 65%.

18. The composition of claim 15, wherein the second ABS polymer composition component is present in an amount from about 1 pph to about 10 pph.

19. The composition of claim 1, wherein the impact modifier comprises at least one acrylonitrile-butadiene-styrene (ABS) polymer composition and at least one methacrylate-butadiene-styrene (MBS) polymer composition.

20. The composition of claim 19, wherein the MBS polymer composition is present in an amount from about 1 pph to about 10 pph.

21. The composition of claim 1, further comprising a styrene-acrylonitrile (SAN) copolymer in an amount from greater than about 0 pph to about 50 pph.

22. An article comprising the composition of claim 1.

23. An article of claim 22, wherein the article is used in automotive applications.

24. An article of claim 23, wherein the article is selected from the group consisting of instrument panels, overhead consoles, interior trim, center consoles, panels, quarter panels, rocker panels, trim, fenders, doors, deck lids, trunk lids, hoods, bonnets, roofs, bumpers, fascia, grilles, mirror housings, pillar appliqués, cladding, body side moldings, wheel covers, hubcaps, door handles, spoilers, window frames, headlamp bezels, headlamps, tail lamps, tail lamp housings, tail lamp bezels, license plate enclosures, roof racks, running boards, seats, seat backs, cargo floors, door panels, steering wheels, radio speaker grilles, instrument panel bezels, steering columns, drip rails, energy absorbers, kick panels, mirror housings, grille opening reinforcements, steps, hatch covers, knobs, buttons, and levers.

25. A blended polycarbonate composition with improved hydrolytic stability comprising:
   a. a hydrolytic stabilizer composition comprising:
      i. from about 0.1 pph to about 1 pph of a calcined hydrotalcite; and
      ii. from about 0.1 pph to about 1 pph of an inorganic salt buffer solution;
   b. from about 45 pph to about 80 pph of a polycarbonate polymer;
   c. a first impact modifier and a second impact modifier;
      wherein the first impact modifier is an acrylonitrile-butadiene-styrene (ABS) polymer composition, and is present in an amount from about 30 pph to about 50 pph;
      wherein the first impact modifier has a butadiene content from about 20% to about 75%;
      wherein the second impact modifier is selected from the group consisting of an acrylonitrile-butadiene-styrene (ABS) polymer composition and a methacrylate-butadiene-styrene (MBS) polymer composition, and wherein the second impact modifier is present in an amount from about 1 pph to about 10 pph;
   d. from greater than about 0 pph to about 50 pph of styrene-acrylonitrile (SAN) copolymer; and
   e. pph balance of one or more polymer composition additive selected from the group consisting of a primary heat stabilizer, a secondary heat stabilizer, and a mold release agent;
   wherein the composition exhibits hydrolytic stability with at least about 25% greater weight average molecular weight retention than that of a reference composition consisting essentially of substantially the same proportions of the same polycarbonate polymer composition and the same acrylonitrile-butadiene-styrene (ABS)

polymer composition, in the absence of the same calcined hydrotalcite and the same inorganic salt buffer solution.

26. The composition of claim 25, further comprising one or more polymer composition additive selected from the group consisting of an anti-oxidant, a colorant, a smoke suppressor, an anti-drip agent, and a flame retardant.

27. An article comprising the composition of claim 25.

28. An article of claim 27, wherein the article is used in automotive applications.

29. An article of claim 28, wherein the article is selected from the group consisting of instrument panels, overhead consoles, interior trim, center consoles, panels, quarter panels, rocker panels, trim, fenders, doors, deck lids, trunk lids, hoods, bonnets, roofs, bumpers, fascia, grilles, mirror housings, pillar appliqués, cladding, body side moldings, wheel covers, hubcaps, door handles, spoilers, window frames, headlamp bezels, headlamps, tail lamps, tail lamp housings, tail lamp bezels, license plate enclosures, roof racks, running boards, seats, seat backs, cargo floors, door panels, steering wheels, radio speaker grilles, instrument panel bezels, steering columns, drip rails, energy absorbers, kick panels, mirror housings, grille opening reinforcements, steps, hatch covers, knobs, buttons, and levers.

30. A blended polycarbonate composition with improved hydrolytic stability comprising:
 a. a hydrolytic stabilizer composition comprising:
  i. from about 0.1 pph to about 1 pph of a calcined hydrotalcite; and
  ii. from about 0.1 pph to about 1 pph of an inorganic salt buffer solution;
 b. from about 45 pph to about 70 pph of a polycarbonate polymer;
 c. a first impact modifier and a second impact modifier;
  wherein the first impact modifier is an acrylonitrile-butadiene-styrene (ABS) polymer composition, and is present in an amount from about 30 pph to about 50 pph;
  wherein the first impact modifier has a butadiene content from about 20% to about 75%;
  wherein the second impact modifier is selected from the group consisting of an acrylonitrile-butadiene-styrene (ABS) polymer composition and a methacrylate-butadiene-styrene (MBS) polymer composition, and
  wherein the second impact modifier is present in an amount from about 1 pph to about 10 pph;
 d. from greater than about 0 pph to about 50 pph of styrene-acrylonitrile (SAN) copolymer; and
 e. pph balance of one or more polymer composition additive selected from the group consisting of a primary heat stabilizer, a secondary heat stabilizer, and a mold release agent;
 wherein the composition exhibits hydrolytic stability with at least about 25% greater weight average molecular weight retention than that of a reference composition consisting essentially of substantially the same proportions of the same polycarbonate polymer composition and the same acrylonitrile-butadiene-styrene (ABS) polymer composition, in the absence of the same calcined hydrotalcite and the same inorganic salt buffer solution.

31. The composition of claim 30, further comprising one or more polymer composition additive selected from the group consisting of an anti-oxidant, a colorant, a smoke suppressor, an anti-drip agent, and a flame retardant.

32. An article comprising the composition of claim 31.

33. An article of claim 32, wherein the article is used in automotive applications.

34. An article of claim 33, wherein the article is selected from the group consisting of instrument panels, overhead consoles, interior trim, center consoles, panels, quarter panels, rocker panels, trim, fenders, doors, deck lids, trunk lids, hoods, bonnets, roofs, bumpers, fascia, grilles, mirror housings, pillar appliqués, cladding, body side moldings, wheel covers, hubcaps, door handles, spoilers, window frames, headlamp bezels, headlamps, tail lamps, tail lamp housings, tail lamp bezels, license plate enclosures, roof racks, running boards, seats, seat backs, cargo floors, door panels, steering wheels, radio speaker grilles, instrument panel bezels, steering columns, drip rails, energy absorbers, kick panels, mirror housings, grille opening reinforcements, steps, hatch covers, knobs, buttons, and levers.

35. A blended polycarbonate composition with improved hydrolytic stability comprising:
 a. a hydrolytic stabilizer composition comprising:
  i. from about 0.1 pph to about 1 pph of a calcined hydrotalcite; and
  ii. from about 0.1 pph to about 1 pph of an inorganic salt buffer solution;
 b. from about 45 pph to about 55 pph of a polycarbonate polymer;
 c. a first impact modifier and a second impact modifier;
  wherein the first impact modifier is an acrylonitrile-butadiene-styrene (ABS) polymer composition, and is present in an amount from about 45 pph to about 55 pph;
  wherein the first impact modifier has a butadiene content from about 20% to about 75%;
  wherein the second impact modifier is selected from the group consisting of an acrylonitrile-butadiene-styrene (ABS) polymer composition and a methacrylate-butadiene-styrene (MBS) polymer composition, and
  wherein the second impact modifier is present in an amount from about 1 pph to about 10 pph;
 d. from greater than about 0 pph to about 50 pph of styrene-acrylonitrile (SAN) copolymer; and
 e. pph balance of one or more polymer composition additive selected from the group consisting of a primary heat stabilizer, a secondary heat stabilizer, and a mold release agent;
 wherein the composition exhibits hydrolytic stability with at least about 25% greater weight average molecular weight retention than that of a reference composition consisting essentially of substantially the same proportions of the same polycarbonate polymer composition and the same acrylonitrile-butadiene-styrene (ABS) polymer composition, in the absence of the same calcined hydrotalcite and the same inorganic salt buffer solution.

36. The composition of claim 35, further comprising one or more polymer composition additive selected from the group consisting of an anti-oxidant, a colorant, a smoke suppressor, an anti-drip agent, and a flame retardant.

37. An article comprising the composition of claim 31.

38. An article of claim 37, wherein the article is used in automotive applications.

39. An article of claim 38, wherein the article is selected from the group consisting of instrument panels, overhead consoles, interior trim, center consoles, panels, quarter panels, rocker panels, trim, fenders, doors, deck lids, trunk lids, hoods, bonnets, roofs, bumpers, fascia, grilles, mirror housings, pillar appliqués, cladding, body side moldings, wheel covers, hubcaps, door handles, spoilers, window frames, headlamp bezels, headlamps, tail lamps, tail lamp housings, tail lamp bezels, license plate enclosures, roof racks, running boards, seats, seat backs, cargo floors, door panels, steering wheels, radio speaker grilles, instrument panel bezels, steering columns, drip rails, energy absorbers, kick panels, mirror housings, grille opening reinforcements, steps, hatch covers, knobs, buttons, and levers.

* * * * *